(12) United States Patent
Agrawal et al.

(10) Patent No.: US 8,982,851 B2
(45) Date of Patent: Mar. 17, 2015

(54) HEARABILITY IMPROVEMENTS FOR REFERENCE SIGNALS

(75) Inventors: Avneesh Agrawal, San Diego, CA (US);
Ashwin Sampath, Skillman, NJ (US);
Ravi Palanki, San Diego, CA (US);
Naga Bhushan, San Diego, CA (US);
Raja Sekhar Bachu, Somerset, NJ (US);
Aamod D. Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 474 days.

(21) Appl. No.: 12/651,838

(22) Filed: Jan. 4, 2010

(65) Prior Publication Data

US 2010/0172311 A1    Jul. 8, 2010

Related U.S. Application Data

(60) Provisional application No. 61/142,784, filed on Jan. 6, 2009, provisional application No. 61/144,075, filed on Jan. 12, 2009, provisional application No. 61/149,647, filed on Feb. 3, 2009, provisional application No. 61/151,128, filed on Feb. 9, 2009, provisional application No. 61/163,429, filed on Mar. 25, 2009.

(51) Int. Cl.
*H04B 7/216* (2006.01)
*H04L 27/28* (2006.01)
(Continued)

(52) U.S. Cl.
CPC ............ *H04L 5/0048* (2013.01); *H04L 5/0082* (2013.01); *H04W 72/1247* (2013.01)
USPC ............ 370/335; 370/342; 370/208; 375/260

(58) Field of Classification Search
CPC ..... H04W 64/00; H04W 24/10; H04W 52/16; H04W 72/042; H04L 5/0048; H04L 5/0053; H04L 5/0007; H04L 5/0023

USPC .......... 375/260–262; 370/329–330, 335–338, 370/342–348

See application file for complete search history.

(56) References Cited

U.S. PATENT DOCUMENTS

| 5,859,612 | A | 1/1999 | Gilhousen |
| 6,185,429 | B1 | 2/2001 | Gehrke et al. |

(Continued)

FOREIGN PATENT DOCUMENTS

| CN | 1288645 A | 3/2001 |
| CN | 1454013 A | 11/2003 |

(Continued)

OTHER PUBLICATIONS

International Search Report and Written Opinion—PCT/US2010/020271, International Search Authority—European Patent Office—Jul. 15, 2010.

(Continued)

*Primary Examiner* — Thai Hoang

(57) ABSTRACT

Systems and methodologies are described that facilitate providing high reuse for transmitting reference signals, such as positioning reference signals (PRS) and cell-specific reference signals (CRS), to improve hearability thereof for applications such as trilateration and/or the like. In particular, PRSs can be transmitted in designated or selected positioning subframes. Resource elements within the positioning subframe can be selected for transmitting the PRSs and can avoid conflict with designated control regions, resource elements used for transmitting cell-specific reference signals, and/or the like. Resource elements for transmitting PRSs can be selected according to a planned or pseudo-random reuse scheme. In addition, a transmit diversity scheme can be applied to the PRSs to minimize impact of introducing the PRSs to legacy devices. Moreover, portions of a subframe not designated for PRS transmission can be utilized for user plane data transmission.

42 Claims, 17 Drawing Sheets

(51) Int. Cl.
*H04J 11/00* (2006.01)
*H04L 5/00* (2006.01)
*H04W 72/12* (2009.01)

(56) References Cited

U.S. PATENT DOCUMENTS

| | | | |
|---|---|---|---|
| 6,317,049 B1 | 11/2001 | Toubia et al. | |
| 6,317,474 B1 | 11/2001 | Carsello | |
| 6,445,927 B1 | 9/2002 | King et al. | |
| 6,570,530 B2 | 5/2003 | Gaal et al. | |
| 6,714,563 B1 | 3/2004 | Kushi | |
| 6,894,644 B2 | 5/2005 | Duffett-Smith et al. | |
| 7,233,800 B2 | 6/2007 | Laroia et al. | |
| 7,349,366 B2 | 3/2008 | De et al. | |
| 7,660,588 B2 | 2/2010 | Sheynblat et al. | |
| 7,706,328 B2 | 4/2010 | Mukkavilli et al. | |
| 7,729,707 B2 | 6/2010 | Aljadeff et al. | |
| 7,813,383 B2 | 10/2010 | Wang et al. | |
| 7,817,616 B2 | 10/2010 | Park et al. | |
| 7,826,343 B2 | 11/2010 | Krasner | |
| 7,940,740 B2 * | 5/2011 | Krishnamurthy et al. | 370/344 |
| 8,130,657 B2 | 3/2012 | Mosko | |
| 8,165,586 B2 * | 4/2012 | Krishnamurthy et al. | 455/436 |
| 8,228,923 B1 | 7/2012 | Jain et al. | |
| 8,233,432 B2 | 7/2012 | Northcutt et al. | |
| 8,289,159 B2 | 10/2012 | Julian et al. | |
| 8,326,318 B2 | 12/2012 | Attar et al. | |
| 2001/0004601 A1 | 6/2001 | Drane et al. | |
| 2001/0034238 A1 | 10/2001 | Voyer | |
| 2002/0118723 A1 | 8/2002 | McCrady et al. | |
| 2002/0155845 A1 | 10/2002 | Martorana | |
| 2003/0036390 A1 | 2/2003 | Villier et al. | |
| 2003/0119523 A1 | 6/2003 | Bulthuis | |
| 2003/0189948 A1 | 10/2003 | Sashihara | |
| 2004/0033808 A1 | 2/2004 | Rorabaugh | |
| 2004/0052228 A1 | 3/2004 | Tellado et al. | |
| 2005/0153653 A1 | 7/2005 | Diao et al. | |
| 2005/0192024 A1 | 9/2005 | Sheynblat | |
| 2005/0281247 A1 | 12/2005 | Lim et al. | |
| 2006/0125690 A1 | 6/2006 | Goren et al. | |
| 2006/0160545 A1 | 7/2006 | Goren et al. | |
| 2007/0040703 A1 | 2/2007 | Akkarakaran et al. | |
| 2007/0075899 A1 | 4/2007 | Inaba | |
| 2007/0121560 A1 | 5/2007 | Edge | |
| 2007/0155401 A1 | 7/2007 | Ward et al. | |
| 2007/0176826 A1 | 8/2007 | Daniele et al. | |
| 2007/0177605 A1 | 8/2007 | Benco et al. | |
| 2008/0088507 A1 | 4/2008 | Smith et al. | |
| 2008/0125161 A1 | 5/2008 | Ergen et al. | |
| 2008/0126161 A1 | 5/2008 | Willis et al. | |
| 2008/0132247 A1 | 6/2008 | Anderson | |
| 2008/0137691 A1 | 6/2008 | Barry et al. | |
| 2008/0232517 A1 | 9/2008 | Terabe et al. | |
| 2008/0267304 A1 | 10/2008 | Chong et al. | |
| 2008/0274750 A1 | 11/2008 | Carlson et al. | |
| 2008/0285505 A1 | 11/2008 | Carlson et al. | |
| 2008/0318596 A1 | 12/2008 | Tenny | |
| 2009/0034459 A1 | 2/2009 | Shousterman et al. | |
| 2009/0097452 A1 | 4/2009 | Gogic | |
| 2009/0149169 A1 | 6/2009 | Tanno et al. | |
| 2009/0322603 A1 | 12/2009 | Liao | |
| 2010/0014443 A1 | 1/2010 | Cristian et al. | |
| 2010/0029295 A1 | 2/2010 | Touboul et al. | |
| 2010/0054237 A1 | 3/2010 | Han et al. | |
| 2010/0074180 A1 | 3/2010 | Palanki et al. | |
| 2010/0110983 A1 | 5/2010 | Fu | |
| 2010/0118737 A1 | 5/2010 | Kim et al. | |
| 2010/0172311 A1 * | 7/2010 | Agrawal et al. | 370/329 |
| 2010/0232543 A1 * | 9/2010 | Sampath et al. | 375/295 |
| 2010/0260154 A1 * | 10/2010 | Frank et al. | 370/336 |
| 2010/0273506 A1 * | 10/2010 | Stern-Berkowitz et al. | 455/456.1 |
| 2010/0279707 A1 | 11/2010 | Fischer et al. | |
| 2010/0322184 A1 * | 12/2010 | Xiao | 370/330 |
| 2011/0059752 A1 | 3/2011 | Garin et al. | |
| 2011/0103338 A1 * | 5/2011 | Astely et al. | 370/329 |
| 2011/0124347 A1 * | 5/2011 | Chen et al. | 455/456.1 |
| 2011/0188438 A1 * | 8/2011 | Lee et al. | 370/312 |
| 2011/0237270 A1 * | 9/2011 | Noh et al. | 455/450 |
| 2011/0317641 A1 * | 12/2011 | Noh et al. | 370/329 |
| 2012/0027110 A1 * | 2/2012 | Han et al. | 375/260 |
| 2012/0046047 A1 * | 2/2012 | Popovic et al. | 455/456.1 |
| 2012/0057498 A1 * | 3/2012 | Han et al. | 370/252 |
| 2012/0120842 A1 * | 5/2012 | Kim et al. | 370/252 |
| 2012/0120903 A1 * | 5/2012 | Kim et al. | 370/329 |
| 2012/0120917 A1 * | 5/2012 | Shimomura et al. | 370/331 |
| 2012/0165012 A1 | 6/2012 | Fischer et al. | |
| 2012/0188129 A1 | 7/2012 | Ameti et al. | |
| 2012/0189041 A1 * | 7/2012 | Ko et al. | 375/219 |
| 2012/0229337 A1 | 9/2012 | Parker | |
| 2014/0071897 A1 | 3/2014 | Palanki et al. | |

FOREIGN PATENT DOCUMENTS

| | | |
|---|---|---|
| CN | 1595836 A | 3/2005 |
| CN | 1628488 A | 6/2005 |
| CN | 1826538 A | 8/2006 |
| CN | 101048994 A | 10/2007 |
| EP | 1041746 A1 | 10/2000 |
| EP | 1148755 A1 | 10/2001 |
| EP | 1355450 A1 | 10/2003 |
| EP | 1396730 A1 | 3/2004 |
| EP | 1887823 A1 | 2/2008 |
| EP | 1898542 A1 | 3/2008 |
| JP | 2003204573 A | 7/2003 |
| JP | 2003520532 A | 7/2003 |
| JP | 2004101254 A | 4/2004 |
| JP | 2006003187 A | 1/2006 |
| JP | 2007089113 A | 4/2007 |
| JP | 2007533968 A | 11/2007 |
| JP | 2008002866 A | 1/2008 |
| JP | 2008236382 A | 10/2008 |
| JP | 2008236383 A | 10/2008 |
| JP | 2009052948 A | 3/2009 |
| JP | 2010500794 A | 1/2010 |
| JP | 2010525633 A | 7/2010 |
| KR | 100824044 B1 | 4/2008 |
| RU | 2120183 C1 | 10/1998 |
| RU | 2179371 C1 | 2/2002 |
| RU | 2233033 C2 | 7/2004 |
| TW | I223534 B | 11/2004 |
| TW | 200733614 | 9/2007 |
| WO | WO-9427381 A1 | 11/1994 |
| WO | WO-0035117 A2 | 6/2000 |
| WO | 0154422 A2 | 7/2001 |
| WO | WO-02071095 | 9/2002 |
| WO | 03055272 A1 | 7/2003 |
| WO | 2004104621 | 12/2004 |
| WO | 2005041602 A1 | 5/2005 |
| WO | WO2005081012 A1 | 9/2005 |
| WO | WO2006109538 A1 | 10/2006 |
| WO | WO-2007127886 A2 | 11/2007 |
| WO | 2008073706 A1 | 6/2008 |
| WO | WO2008127185 A1 | 10/2008 |
| WO | WO-2008137607 | 11/2008 |
| WO | WO-2008157841 | 12/2008 |
| WO | WO2009149104 A2 | 12/2009 |
| WO | WO-2010056453 A1 | 5/2010 |

OTHER PUBLICATIONS

Motorola: "Impact of Supporting "Blank" Subframes"3GPP TSG RAN Plenary Meeting No. 42 Dec. 5, 2008, XP002589696Athens, Greece Retrieved from the Internet:URL:http://www.3gpp.org/ftp/tsg_ran/tsg_ran/TSGR_42/ docs/ [retrieved on Jun. 28, 2010.

Qualcomm Europe: Impact of Blank Subframes on Intrafrequency Measurements ^ GPP TSG-RAN WG4 No. 49 Nov. 6, 2008, XP002589698Prague, CZ Retrieved from the Internet:URL:http://www.3gpp.org/ftp/tsg_ran/wg4_radio/TSGR4_49/Documents/ [retrie.

Qualcomm Europe: "Way forward on forward compatible subframes for Rel-8"3GPP TSG RAN Plenary Meeting No. 42 Dec. 5, 2008,

(56) References Cited

OTHER PUBLICATIONS

XP002589697Athens, Greece Retrieved from the Internet:URL:http://www.3gpp.org/ftp/tsg^ran/tsg_ran/TSGR_42/docs/ [re.

3GPP TS 25.215 V8.2.0 (Sep. 2008), 3rd Generation Partnership Project; Technical Specification Group Radio Access Network; Physical layer—Measurements (FDD) (Release 8), Sep. 2008.

3GPP TS 25.305 V8.0.0 (Dec. 2007), 3rd Generation Partnership Project; Technical Specification Group Radio Access Network; Stage 2 functional specification of User Equipment (UE) positioning in UTRAN (Release 8) Dec. 2007.

3GPP TR 38.942 V8.1.0 (Dec. 2008), 3rd Generation Partnership Project; Technical Specification Group Radio Access Network; Evolved Universal Terrestrial Radio Access (E-UTRA); Radio Frequency (RF) system scenarios; (Release 8), Dec. 2008.

"Time Aligned IP-DL positioning technique", Source: Motorola, TSG-RAN Working Group 1, Ah Hoc 17, TSGR1#7(99)b79, Meeting 7, Aug. 30-Sep. 3, 1999, Hannover, Germany.

"Evaluation of IP-DL Positioning Techniques Using Common Simulation Parameters", Source: Ericsson, TSG-RAN Working Group 1 Meeting 8, Ad Hoc 17, TSGR1#8(99)g88, Oct. 12-15, 1999, Manhattan, USA.

"On OTDOA in LTE", Source: Qualcomm Europe, 3GPP TSG-RAN WG1 #55bis, R1-090353, Jan. 12-19, 2009, Ljubijana, Slovenia.

"Further positioning evaluations", Source: Qualcomm Europe, 3GPP TSG-RAN WG1 #56, R1-090851, Feb. 9-13, 2009, Athens, Greece.

"PHY layer specification impact of positioning improvements", Source: Qualcomm Europe, 3GPP TSG-RAN WG1 #56, R1-090852, Feb. 9-13, 2009, Athens, Greece.

"Evaluation parameters for positioning studies", Source: Qualcomm Europe, 3GPP TSG-RAN WG1 #56, R1-090853, Feb. 9-13, 2009, Athens, Greece.

"Recapitulation of the IPDL positioning method", Source: Ericsson, TSG-RAN Working Group 1 meeting #4, TSGR1#4 (99)346, Apr. 18-20, 1999. Shin-Yokohama, Japan.

"Positioning Support for LTE", 3GPP TSG RAN#42, RP-080995, Dec. 2-5, 2008, Athens, Greece.

"Evaluation of Positioning Measurement Systems", Source: Ericsson, T1P1.5/98-110, May 15, 1998.

Y.T. Chan and K. Ho, "A Simple and Efficient Estimator for Hyperbolic Location", IEEE Trans. Signal Processing, vol. 42, No. 8, pp. 1905-1915, Aug. 1994.

Greenstein et al., "A New Path-Gain/Delay-Spread Propagation Model for Digital Cellular Channels", IEEE Transactions on Vehicular Technology, vol. 46, No. 2, pp. 477-485, May 1997.

Wu, et al., "cdma2000 Highly Detectable Pilot", IEEE International Conference on Communications, pp. 16-20, May 2008.

"Functional description, Location Services (LCS), Stage 2 ", (Release 1999) Functional Description, 3GPP TS 03.71 V8.9.0 (Jun. 2004).

Jun Xiao et al: "Research of TDOA Based Self-localization Approach in Wireless Sensor Network", Intelligent Robots and Systems, 2006 IEEE/RSJ International Conference on, IEEE, PI, Oct. 1, 2006, pp. 2035-2040, XP031006391, ISBN: 978-1-4244-0258-8.

Patwari et al., "Relative Location Estimation in Wireless Sensor Networks", IEEE Transactions on Signal Processing, Vol. 51, No. 8, Aug. 2003.

"Stage 2 functional specification of User Equipment (UE) positioning in UTRAN" (Release 9) Technical Specification 3GPP TS 25.305 V9.0.0 (Dec. 2009).

Ward P W: "A Design Technique to Remove the Correlation Ambiguity in Binary Offset Carrier (BOC) Spread Spectrum Signals" Proceedings of the ION National Technical Meeting, The Institute of Navigation, US, Jan. 26, 2004, pp. 886-896, XP001207302.

European Search Report—EP12002375—Search Authority—Munich—May 8, 2012.

Torrieri D.J., "Statistical Theory of Passive Location Systems," IEEE Transactions On Aerospace and Electronic Systems, Mar. 1984, pp. 183-198, vol. AES-20 (2).

Huawei: "Consideration on positioning support for LTE Rel-9," 3GPP TSG RAN WG1 #56bis, Mar. 23, 2009, R1-091257, pp. 6.

Motorola: "Frame Structure and Signaling to Support Relay Operation," 3GPP TSG RAN1 #55bis, Jan. 12, 2009, R1-090331, pp. 3.

Taiwan Search Report—TW099100193—TIPO—Apr. 1, 2014.

Nardi S., et al., "GPS estimation algorithm using stochastic modeling", Decision and Control, 1998, Proceedings of the 37th IEEE Conference on Tampa, FL, USA Dec. 16-18, 1998, Piscataway, NJ, USA, IEEE, US, vol. 4, Dec. 16, 1998, pp. 4498-4502, XP010643396, DOI: 10.1109/CDC.1998.762029, ISBN: 978-0-7803-4394-8.

Pachter M., et al., "An Efficient GPS Position Determination Algorithm", Navigation, Institute of Navigation, Fairfax, VA, US, vol. 50, No. 2, Sep. 1, 2003, pp. 131-142, XP056004432, 1SSN: 0028-1522.

Sato G., et al., "Improvement of the Positioning Accuracy of a Software-Based GPS Receiver Using a 32-Bit Embedded Microprocessor", IEEE Transactions on Consumer Electronics, IEEE Service Center, New York, NY, US, vol. 46, No. 3, Aug. 1, 2000, pp. 521-530, ISSN: 0098-3063, XP001142876, DOI: 10.1109/30.883405.

\* cited by examiner

HEARABILITY IMPROVEMENTS FOR REFERENCE SIGNALS

CROSS-REFERENCE

This application claims the benefit of U.S. Provisional Application Ser. No. 61/142,784, filed Jan. 6, 2009, and entitled "A METHOD AND APPARATUS FOR IMPROVING HEARABILITY FOR DISCONTINUOUS PILOT SYSTEM," U.S. Provisional Application Ser. No. 61/144,075, filed Jan. 12, 2009, and entitled "A METHOD AND APPARATUS FOR IMPROVING HEARABILITY FOR DISCONTINUOUS PILOT SYSTEM," U.S. Provisional Application Ser. No. 61/149,647, filed Feb. 3, 2009, and entitled "A METHOD AND APPARATUS FOR IMPROVING HEARABILITY FOR DISCONTINUOUS PILOT SYSTEM," U.S. Provisional Application Ser. No. 61/151,128, filed Feb. 9, 2009, and entitled "A METHOD AND APPARATUS FOR IMPROVING HEARABILITY FOR DISCONTINUOUS PILOT SYSTEM," U.S. Provisional Application Ser. No. 61/163,429, filed Mar. 25, 2009, and entitled "A METHOD AND APPARATUS FOR IMPROVING HEARABILITY FOR DISCONTINUOUS PILOT SYSTEM," the entireties of which are incorporated herein by reference.

BACKGROUND

I. Field

The present disclosure relates generally to wireless communications and more specifically to transmitting reference signals to improve hearability thereof.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc.

Generally, wireless multiple-access communication systems may simultaneously support communication for multiple mobile devices. Each mobile device may communicate with one or more access points (e.g., base stations, femtocells, picocells, relay nodes, and/or the like) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

Access points in wireless networks can transmit cell-specific reference signals (CRS) to facilitate identifying cells of the access points; in addition, the CRSs can be utilized to determine a location of one or more mobile devices or other devices using trilateration or similar location mechanisms. For example, techniques such as observed time difference of arrival (OTDOA) in universal mobile telecommunication system (UMTS) are used to compute a possible location of a device based at least in part on measuring a time difference of multiple signals received and/or location of the transmitter of each signal. Similar techniques in other technologies include enhanced observed time difference (E-OTD) in global system for mobile communications (GSM) enhanced data rates for GSM evolution (EDGE) radio access network (GERAN), advanced forward link trilateration (AFLT) in CDMA2000, etc.

In addition, technologies such as idle period down link (IPDL) and time-aligned IDPL (TA-IPDL) in UMTS, as well as highly detectable pilot (HDP) in CDMA2000, improve hearability of the CRSs by blanking (e.g., temporarily ceasing) transmissions over certain periods of time. In IPDL, one or more access points can blank transmission in a different period of time (e.g., a slot of subframe defined as an IPDL period) allowing a device to measure CRSs of access points that are normally strongly interfered by other access points during the periods where the interfering access points blank transmissions. Performance gains, however, are limited by blanking only one interfering access point in a given IPDL period. In TA-IPDL, the access points can define a similar common time period, referred to as a TA-IPDL period. During this period, some access points will blank transmissions while others transmit an access-point specific pilot allowing devices to measure this pilot free from substantial interference. The HDP concept in CDMA2000 uses the same principle as TA-IPDL. TA-IPDL, however, is not always applicable in asynchronous networks. Moreover, in IPDL and TA-IPDL, legacy mobiles that are not aware of the periods of time for blanking and/or transmitting common pilots, can cause data errors. For example, lack of pilots or pilot modification can result in channel estimation errors and/or hybrid automatic repeat/request (HARD) buffers corruption due to the assumption that the pilots exist.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

In accordance with one or more embodiments and corresponding disclosure thereof, various aspects are described in connection with facilitating defining a set of time periods for transmitting positioning reference signals at various access points. In particular, an access point can transmit cell-specific reference signals (CRS) in a portion of a time period defined for transmitting such CRSs while other access points blank transmission over the time period. During a disparate portion of the time period reserved for transmitting CRSs, one or more access points can transmit positioning reference signals (PRS). In one example, the PRSs can be transmitted by access points in planned or pseudo-randomly selected time-frequency regions, for example single or group (consecutive or otherwise) of subframes, slots, resource blocks, subbands, etc., to increase hearability thereof. In addition, PRSs can be transmitted by the access points according to one or more transmit diversity schemes to mitigate interference among the PRSs. In one example, a remaining portion of the time period allocated for transmitting CRSs, which would otherwise remain blanked by other access points, is leveraged for PRS transmission allowing devices to receive the PRSs without substantial interference. It is to be appreciated, in one example, that the PRS can be utilized for trilateration to determine a location of a receiving device.

According to related aspects, a method is provided that includes determining a positioning subframe configured for transmitting PRSs and selecting one or more resource elements in the positioning subframe for transmitting a PRS avoiding resource elements in the positioning subframe configured for transmitting a CRS. The method also includes transmitting the PRS in the one or more resource elements.

Another aspect relates to a wireless communications apparatus. The wireless communications apparatus can include at least one processor configured to select a portion of a positioning subframe for transmitting PRSs and determine one or more resource elements in the positioning subframe, excluding a plurality of disparate resource elements allocated for transmitting CRSs, for transmitting a PRS. The at least one processor is further configured to transmit the PRS in the one or more resource elements. The wireless communications apparatus also comprises a memory coupled to the at least one processor.

Yet another aspect relates to an apparatus. The apparatus includes means for determining a positioning subframe configured for transmitting PRSs and means for selecting one or more resource elements in the positioning subframe, excluding a set of resource elements allocated for transmitting CRSs, for transmitting a PRS. The apparatus further includes means for transmitting the PRS in the one or more resource elements.

Still another aspect relates to a computer program product, which can have a computer-readable medium including code for causing at least one computer to select a portion of a positioning subframe for transmitting PRSs and code for causing the at least one computer to determine one or more resource elements in the positioning subframe, excluding a plurality of disparate resource elements allocated for transmitting CRSs, for transmitting a PRS. The computer-readable medium can also comprise code for causing the at least one computer to transmit the PRS in the one or more resource elements.

Moreover, an additional aspect relates to an apparatus that includes a special slot selecting component that determines a positioning subframe configured for transmitting PRSs and a PRS resource element selecting component that selects one or more resource elements in the positioning subframe, excluding a set of resource elements allocated for transmitting CRSs, for transmitting a PRS. The apparatus can further include a PRS transmitting component that transmits the PRS in the one or more resource elements.

According to another aspect, a method is provided that includes selecting one or more subframes as one or more positioning subframes for blanking data transmissions and indicating one or more of the one or more positioning subframes as one or more multicast/broadcast single frequency network (MBSFN) subframes to additionally blank CRS transmission over the one or more MBSFN subframes Another aspect relates to a wireless communications apparatus. The wireless communications apparatus can include at least one processor configured to determine one or more subframes as one or more positioning subframes for blanking data transmissions. The at least one processor is further configured to discern one or more of the one or more positioning subframes as one or more MBSFN subframes to additionally blank CRS transmission over the one or more MBSFN subframes and indicate the one or more MBSFN subframes as MBSFN subframes. The wireless communications apparatus also comprises a memory coupled to the at least one processor.

Yet another aspect relates to an apparatus. The apparatus includes means for selecting one or more subframes as one or more positioning subframes for blanking data transmissions and means for determining the one or more positioning subframes as one or more MBSFN subframes. The apparatus further includes means for indicating the one or more MBSFN subframes as MBSFN subframes.

Still another aspect relates to a computer program product, which can have a computer-readable medium including code for causing at least one computer to select one or more subframes as one or more positioning subframes for blanking data transmissions. The computer-readable medium can also comprise code for causing the at least one computer to indicate the one or more positioning subframes as one or more MBSFN subframes to additionally blank CRS transmission over the one or more MBSFN subframes.

Moreover, an additional aspect relates to an apparatus that includes a positioning subframe selecting component that determines one or more subframes as one or more positioning subframes for blanking data transmissions and a MBSFN subframe determining component that selects the one or more positioning subframes as one or more MBSFN subframes. The apparatus can further include an MBSFN subframe specifying component that indicates the one or more MBSFN subframes as MBSFN subframes.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed, and the described embodiments are intended to include all such aspects and their equivalents.

DETAILED DESCRIPTION

Figure 1:
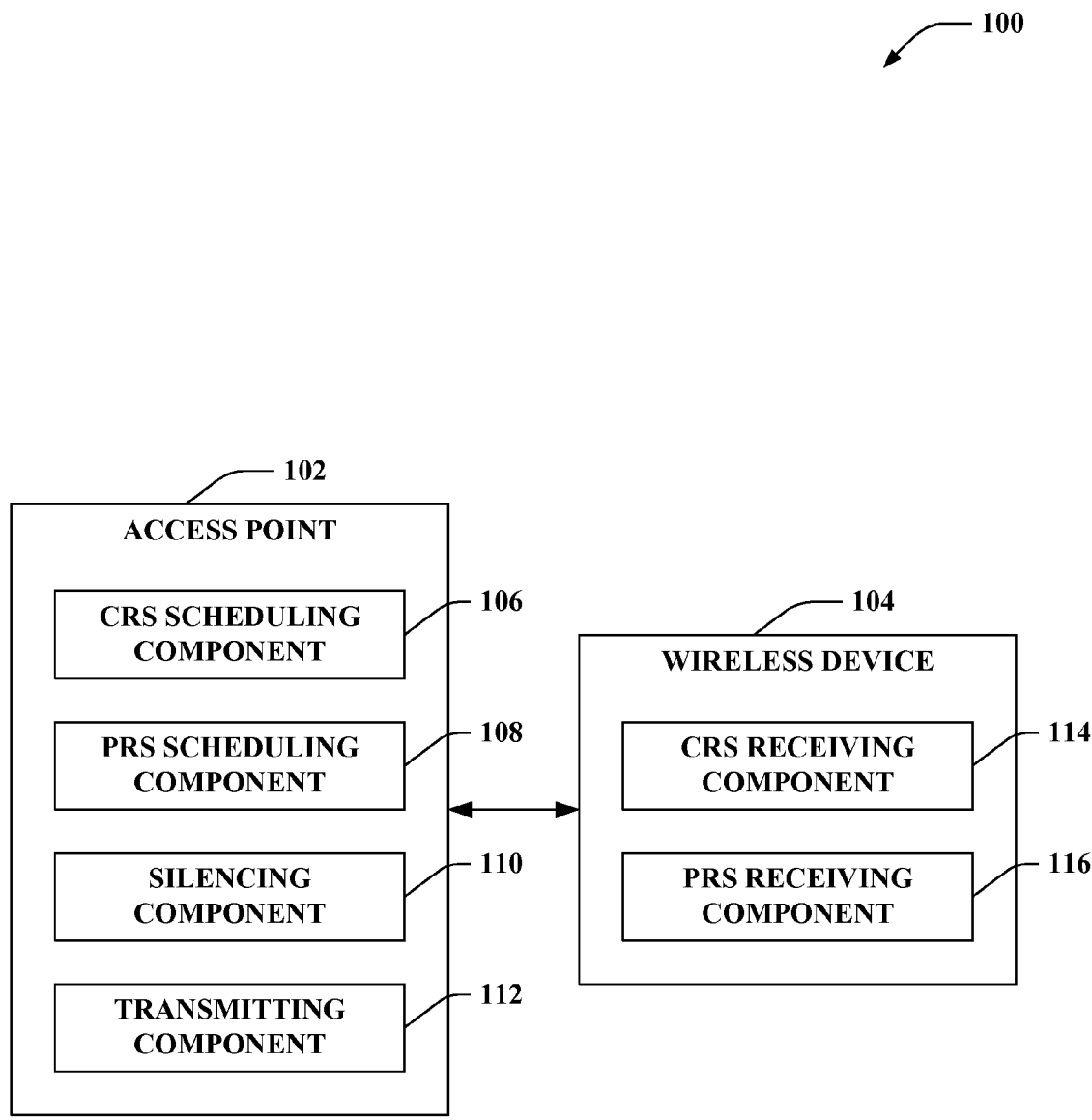
FIG. 1 is a block diagram of a system for transmitting cell-specific reference signals (CRS) and positioning reference signals (PRS).

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates an example wireless network 100 that facilitates transmitting cell-specific reference signals (CRS) and positioning reference signals (PRS). Wireless network 100 includes an access point 102 that can provide wireless network access to one or more devices. Access point 102, for example, can be an access point, such as a macrocell access point, femtocell or picocell access point, eNB, mobile base station, a portion thereof, and/or substantially any device that provides access to a wireless network. In addition, wireless network 100 includes a wireless device 104 that receives access to a wireless network. Wireless device 104, for example, can be a mobile device, such as a UE, a portion thereof, and/or substantially any device that receives access to a wireless network. It is to be appreciated that the components shown and described in access point 102 can be present in wireless device 104 and/or vice versa, in one example, to facilitate functionality described below.

Access point 102 can include a CRS scheduling component 106 that determines one or more time periods for scheduling CRS transmission, a PRS scheduling component 108 that selects one or more time periods for transmitting PRSs, a silencing component 110 that discerns one or more time periods during which to cease data transmissions, and a transmitting component 112 that transmits the CRS and/or PRS and ceases transmissions over the silent time periods. Wireless device 104 comprises a CRS receiving component 114 that obtains one or more CRSs of one or more access points during certain time periods and a PRS receiving component 116 that determines one or more PRSs received during a portion of the certain time periods during which the one or more CRSs are received.

According to an example, CRS scheduling component 106 can select a portion of a time period for transmitting CRSs. This can be defined according to a standard, a network specification, configuration, hardcoding, a received variable, and/or the like, for example. The CRS scheduling component 106, in one example, can select a similar portion of a number of time periods for transmitting the CRS, such as one or more portions of a subframe or multiple subframes, which can be consecutive or otherwise. Transmitting component 112 can transmit the CRS in the portion of the time period. In addition, PRS scheduling component 108 can select a disparate portion of one or more of the time periods for additionally transmitting PRSs, such as one or more subframes. In an example, PRS scheduling component 108 can select the one or more time periods according to a pseudo-random or planned selection function, which can be based on a standard, network specification, configuration, hardcoding, etc. Moreover, for example, the one or more time periods can be substantially aligned among one or more access points.

Similarly, PRS scheduling component 108 can select the disparate portion of the one or more of the time periods according to a standard, a network specification, configuration, hardcoding, etc., pseudo-randomly according to such, using one or more sequences, such as pseudo-random binary sequences followed by quadrature amplitude modulation (QAM) (e.g., quadrature phase-shift keying (QPSK)), or sequences that ease detectability such as Zadoff-Chu sequences, Walsh sequences, and/or the like, using sequences formed by encoding a payload (e.g., using a low reuse preamble), etc. In addition, transmitting component 112 can transmit the PRSs using one or more disparate transmit diversity schemes, such as precoding vector switching (PVS), small cyclic delay diversity (CDD), etc. to minimize receiver impact due to introducing the one or more time periods and PRSs. Moreover, in this regard, transmitting component 112 can transmit the PRSs (and CRSs) over a single antenna port (or a single virtual antenna over multiple physical antennas) using the one or more transmit diversity schemes.

In addition, transmitting component 112 can transmit the PRS over the disparate portion of the one or more time periods. Silencing component 110 can cease transmission by access point 102 over the remaining portions of the one or more time periods selected by the PRS scheduling component 108. CRS receiving component 114 can obtain the CRS transmitted by access point 102 for identifying the access point, for example, as well as the PRS for utilization in trilateration location for wireless device 104. In this example, by transmitting PRSs in available portions of the one or more time periods, hearability is improved for wireless devices as other interfering access points can be silent while the PRS for a disparate access point is transmitted, but can still transmit CRSs. This can also ensure correct channel estimation for legacy device support.

According to one example, wireless network 100 can be an LTE network such that access point 102 and wireless device 104 communicate according to an LTE standard. An LTE system can be an orthogonal frequency division multiplexing (OFDM) system in which data is communicated in 1 millisecond (ms) subframes. A subframe can be defined as a portion of frequency over time (e.g., 1 ms). For example, the subframe can include a number of contiguous or non-contiguous OFDM symbols, which are portions of frequency over time and can be divided into smaller resource elements representative of a number of frequency carriers over the OFDM symbols. Consecutive resource elements over the OFDM symbols can be referred to as a resource block, for example. In addition, each subframe can have two slots, for example, that are thus also defined by a number of OFDM symbols and/or resource elements thereof, where control data is transmitted over a portion of a first slot (over one or more OFDM symbols) and user plane data is transmitted over the remainder of the first slot and the entire second slot.

In this example, CRS scheduling component 106, according to the LTE specification, can schedule a plurality of CRSs (e.g., 2 CRSs) for transmission in each slot, transmitted over a plurality of resource elements. CRS receiving component 114, for example, can obtain the CRSs for data demodulation purposes, for cell specific measurements in cell selection/reselection and handover, etc. In addition, however, PRS scheduling component 108 can select special slots, which can be certain time-frequency regions, for transmitting PRSs. As described, this can be according to an LTE specification, which can use an idle period down link (IPDL), time-aligned IDPL (TA-IPDL), highly detectable pilot (HDP), or similar scheme to define the special slots. In this regard, the special slots can be different for each access point (e.g., selected according to a pseudo-random scheme), similar substantially time-aligned special slots across access points, and/or the like. Moreover, the special slot can be the second slot of the respective subframes (e.g., in an LTE configuration) so as not to interfere with control data transmissions in the first slot, and/or a portion of the first slot of the respective subframes that are not utilized for transmitting control data.

The PRS scheduling component 108 can select one or more resource elements as the frequency region for special slots, over which CRSs are not transmitted, for transmitting a PRS related to access point 102. Though not shown, other access points can also select one or more resource elements for transmitting PRSs. In this regard, PRS scheduling component 108, in one example, can schedule PRSs according to one or more sequences that ease detectability and/or mitigate interference, such as Zadoff-Chu sequences, Walsh sequences, QPSK sequences, etc., as described. Additionally, as shown above, transmitting component 112 can transmit the PRS in the resource elements of the special slots, and can do so using transmit diversity, such as PVS, CDD, etc., in one example. PRS receiving component 116 can obtain the PRS for the access point 102, and wireless device 104 can perform trilateration, or another positioning algorithm, in one example. Moreover, for example, in the special slots for transmitting PRSs where PRSs for access point 102 are not received, PRS receiving component 116 can receive PRSs for one or more disparate access points, for example. These PRSs can additionally or alternatively be used in trilateration, etc.

In addition, silencing component 110 can ensure that transmission is ceased for remaining resource elements in the special slots; thus, access point 102 does not transmit data in the special slots or any signals other than the aforementioned CRS(s) (which can be mandatory) and PRS(s) (which can be optional, on a pseudorandom basis). It is to be appreciated, however, that a portion of the special slots, as opposed to the entire slot, can be utilized for transmitting PRSs, within which silencing component 110 ensures transmission is ceased for remaining portion of the special slot and not necessarily the entire remaining slot.

Figure 2:
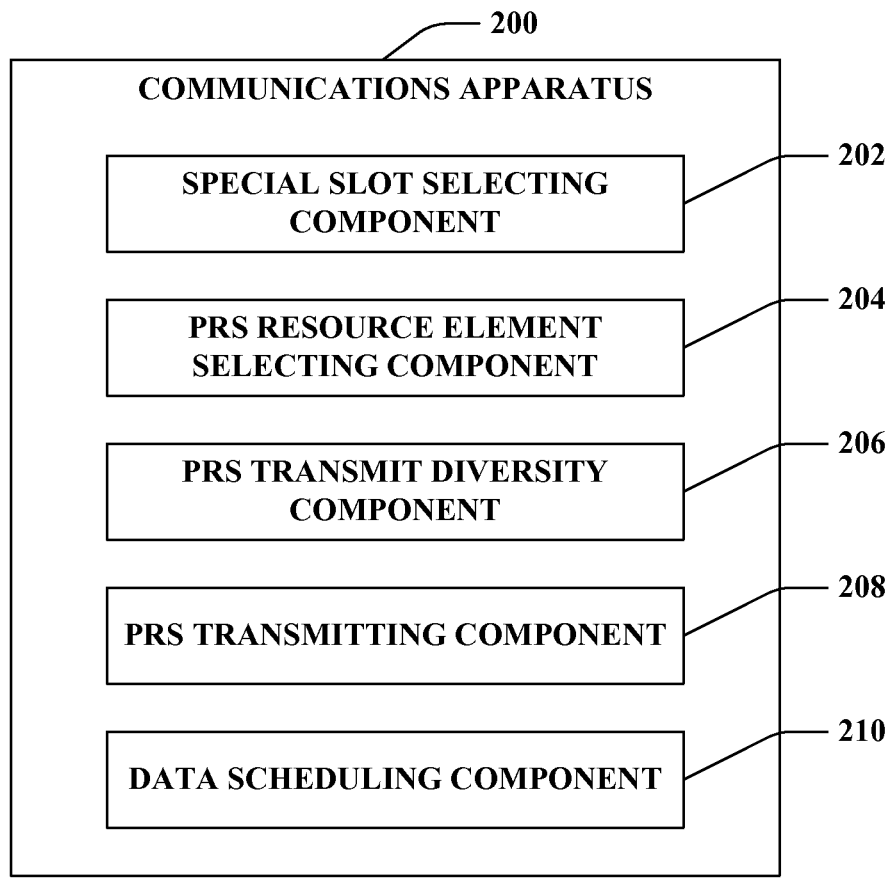
FIG. 2 is an illustration of an example communications apparatus for employment within a wireless communications environment.

Referring next to FIG. 2, a communications apparatus 200 that can participate in a wireless communications network is illustrated. The communications apparatus 200 can be an access point, a mobile device, a portion thereof, or substantially any device that receives communications in a wireless network. The communications apparatus 200 can include a special slot selecting component 202 that determines one or more slots or subframes (or other time/frequency regions) for transmitting one or more PRSs, which can be referred to as positioning subframes when the special slot comprises one subframe, a PRS resource element selecting component 204 that discerns one or more resource elements within the special slot for transmitting the one or more PRSs, a PRS transmit diversity component 206 that applies a transmit diversity scheme to the one or more PRSs to facilitate differentiating PRSs of various communications apparatuses, a PRS transmitting component 208 that can communicate a PRS in a selected slot over a selected resource element using an optional transmit diversity, and a data scheduling component 210 that can select resources for communicating user plane data in a wireless network.

According to an example, special slot selecting component 202 can determine one or more special slots and/or related subframes for transmitting PRSs (e.g., and blanking data transmissions). In one example, the special slots or positioning subframes can be defined in a network specification or standard, and special slot selecting component 202 selects the special slots or positioning subframes based on a standard, network specification, hardcoding, configuration, and/or similar information. Additionally or alternatively, special slot selecting component 202 can select the slots as one or more slots reserved for IPDL, TA-IPDL, HDP, or similar slot.

For example, IPDL can be used in asynchronous networks such that IPDL slots (e.g., slots that are blanked at a respective communications apparatus) are selected pseudo-randomly or according to some pattern to facilitate diversity in blanking the IPDL slots. In another example, TA-IPDL or HDP can be utilized in synchronous networks such that TA-IPDL or HDP slots are substantially aligned at communications apparatuses. As described previously, in TA-IPDL or HDP, some communications apparatuses in a set transmit pilots in the TA-IPDL slots while the remaining communications apparatuses in the set blank transmission in the slots. Determining which communications apparatuses transmit and which blank can additionally be assigned pseudo-randomly or according to a planned deployment based on a standard, network specification, hardcoding, configuration, etc., which can be based on an identifier of the communications apparatus, and/or the like, in one example.

In another example, special slot selecting component 202 can determine the one or more slots based at least in part on a standard, network specification, hardcoding, configuration, a received communication from a wireless network or related device, and/or the like. For example, special slot selecting component 202 can receive slot information from one or more communications apparatuses (e.g., over a backhaul link), detect a CRS transmission from one or more communications apparatuses and select the slot over which the CRS is detected for transmitting PRSs, and/or the like. Moreover, as described, special slot selecting component 202 can, in one example, select a second slot of respective positioning subframes for transmitting PRSs. Additionally or alternatively, special slot selecting component 202 can select a portion of the first slot that excludes a control channel portion for transmitting PRSs. Moreover, special slot selecting component 202 can select a portion of a slot for transmitting PRSs. Additionally, special slot selecting component 202 can select a set of consecutive positioning subframes for transmitting PRSs.

Similarly, PRS resource element selecting component 204 can determine one or more resource elements within the one or more special slots for transmitting the PRS. PRS resource element selecting component 204 can select the resource elements according to a PRS pattern, as described in further detail below. As described, PRS resource element selecting component 204 can determine the resource elements according to a pseudo-random selection function (e.g., based on a cell identifier of a cell of the communications apparatus 200) and/or according to a planned selection function. In any case, PRS resource element selecting component 204, in one example, can retrieve the selection function for determining the PRS pattern based on a standard, network specification, hardcoding, configuration, and/or the like. By selecting slots that are silent with respect to data transmissions and CRSs and using remaining resources of the slots with a reuse scheme, hearability of the PRSs is improved over the otherwise silent resource elements in the subframe.

Once one or more special slots and related resource elements are selected, PRS transmit diversity component 206 can optionally apply a transmission diversity scheme to the PRS. For example, PVS, small CDD, and/or the like can be applied to PRSs to minimize standards and receiver impact caused by introduction of the PRSs and positioning subframes or slots. In another example, non-transparent diversity schemes can be utilized as well. For instance, this allows the PRS transmitting component 208 to transmit PRSs over a single antenna port (or a single virtual antenna port over multiple physical antennas). In either case, for example, PRS transmit diversity component 206 can additionally signal necessary information (e.g., delay between different transmit antennas in CDD) to a receiving device. In another example, PRS transmit diversity component 206 can apply a diversity scheme that utilizes different sets of tones for transmitting disparate PRSs. Thus, for example, a set of tones can be selected by PRS transmit diversity component 206 for transmitting a first PRS, and PRS transmit diversity component 206 can select a disparate set of tones for transmitting a subsequent PRS.

In any case, PRS transmitting component 208 can transmit the PRSs in the selected resource elements of the selected slot(s) (or portion thereof) according to one or more transmit diversity schemes (if present). In addition, PRS transmitting component 208 can boost energy of the PRSs or reshape its spectrum since communications apparatus 200 does not transmit other data in the selected slot(s) (or portion thereof). In addition, data scheduling component 210 can select one or more resources for transmitting user plane data of communications apparatus 200. In this example, data scheduling component 210 can avoid scheduling data over the slot(s) (or portion thereof) selected for transmitting PRSs so as not to interfere with the PRSs. This allows receiving devices to receive and measure PRSs without significant interference from surrounding communications apparatuses, as described.

In another example, to introduce functionality described herein in a backward compatible manner, PRS transmitting component 208 can indicate the selected slots or related subframes as allocated for multicast/broadcast single frequency network (MBSFN) signals. In this regard, previous versions of wireless devices (e.g., an LTE release-8 UE) can avoid non-control regions of the MBSFN subframes. Thus, such legacy devices will not attempt to process the CRSs given that they are not transmitted in the non-control region of MBSFN subframes. For example, the MBSFN subframes can be designated as positioning subframes for transmitting PRSs and can have a higher value periodicity (e.g., 80/160/320 ms). Moreover, the physical control region and cyclic prefix (CP) of the control and non-control regions can be the same as in an MBSFN subframe of mixed carrier to facilitate indicating the subframe as MBSFN and detection as an MBSFN subframe by a legacy device. Other wireless devices, however, can be aware of the use of MBSFN indicated subframes for transmitting the PRSs and can accordingly utilize the PRSs, as described.

Figure 3:
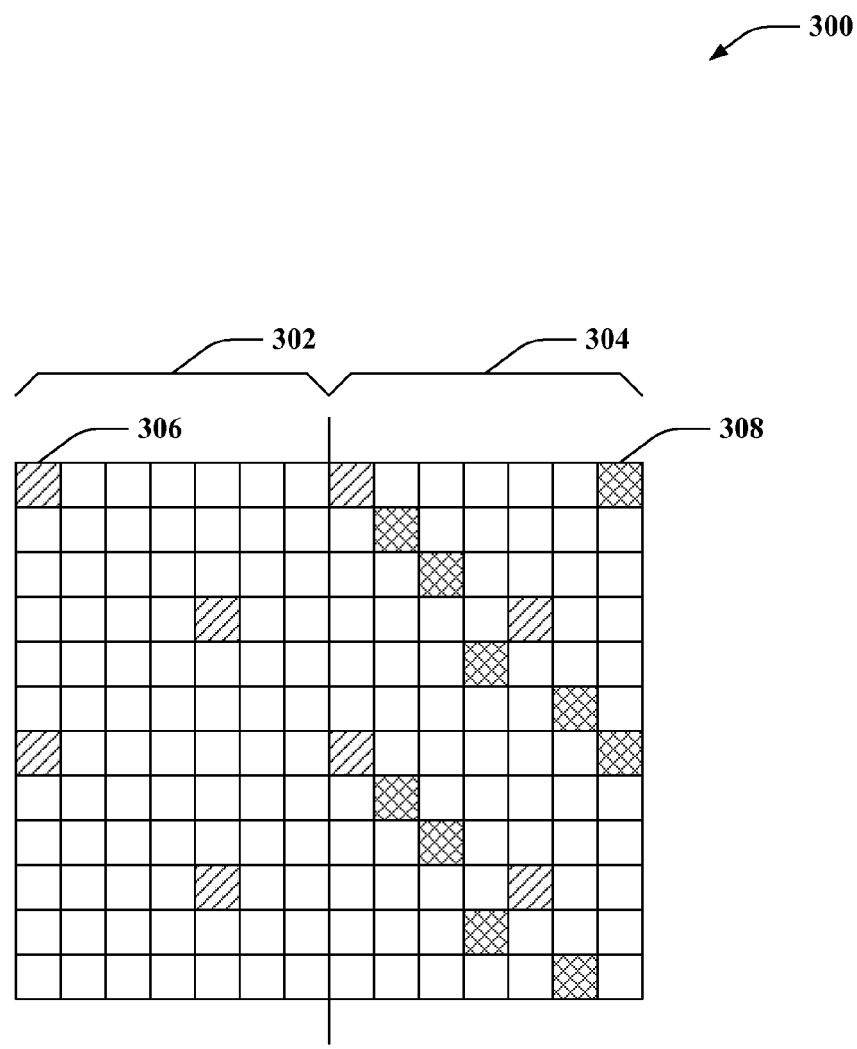
FIG. 3 illustrates an example positioning subframe with resource elements allocated for CRS and PRS transmission.

Now referring to FIG. 3, illustrated is an example positioning subframe 300 in a wireless network. For example, positioning subframe 300 can be an OFDM subframe, as described. Positioning subframe 300 can be a subframe (e.g., a 1 ms or similar subframe) in an LTE system communicated by an access point to one or more wireless devices. For example, access points in a wireless network (not shown) can blank user plane data transmissions over positioning subframe 300, as described herein.

Positioning subframe 300 comprises two slots 302 and 304, each comprising a number of resource elements. As described, in a first slot of a given subframe in LTE, control data can be transmitted over a portion of the resource elements (e.g., over one or more initial OFDM symbols). In this regard, CRSs can be transmitted by various access points in resource element 306, and similarly patterned resource elements, in the first slot 302, along with optionally control data (not shown). User plane data transmissions by a given access point can be ceased over the remaining resource elements of the slot to allow receipt of the CRSs without substantial interference from other transmissions.

In slot 304, PRSs can be transmitted by various access points at resource element 308, and similarly patterned resource elements in slot 304. In this regard, slot 304 can be the special slot selected for transmitting PRSs. Moreover, thus, the PRSs do not interfere with control data transmissions. In addition, by transmitting PRSs in the resource elements that are otherwise silenced by the access points, hearability of the PRSs is improved. As described, PRS resource element 308, and similarly patterned resource elements in slot 304, can be collectively defined as a PRS pattern. The PRS pattern can be a diagonal pattern, as depicted, assigned by the access points for transmitting PRSs. In this regard, for example, an access point can utilize different subcarriers in different OFDM symbols for transmitting PRSs, aside from those utilized for transmitting CRSs in the depicted example. In an example, using substantially all subcarriers in the resource block (or slot 304) over the duration of slot 304. This ensures a channel estimation provided by the PRS is of maximum possible length and mitigates ambiguity with respect to cyclic shifts. In an example, using the different subcarriers in OFDM symbols that form a diagonal pattern is one way of utilizing the substantially all subcarriers in the resource block.

According to an example, the PRS patterns can be assigned according to a standard or network specification, which can be hardcoded in the access point implementation, a configuration, etc. In addition, other than being diagonal patterns, the PRS patterns can employ substantially configuration such that there is a PRS transmitted in each OFDM symbol of a special slot and/or positioning subframe (except those reserved for CRS transmission) so as to maximize the energy contained in the PRS and to fully utilize the access point transmit power. In one example, the resource elements can be comprised within the same subcarrier in consecutive OFDM symbols for transmitting PRSs. In other examples, such as that depicted, shifting (diagonal, random, pseudo-random, or otherwise) can be applied to the subcarriers at each OFDM symbol to provide a level of diversity and to ensure the channel estimation has substantially no ambiguity with respect to cyclic shifts. Moreover, for example, the resource elements selected for the PRS pattern can have a similar periodicity and similar structure as the CRS pattern.

In this or an alternative example, the PRS patterns can be assigned according to a reuse scheme, which is planned and/or pseudo-random, to the access points, or cells thereof. In either case, for example, the PRS patterns can be assigned based at least in part on an identifier of the access point (e.g., a physical cell identifier (PCI) of a cell provided by the access point). Moreover, for example, the PRS sequences assigned to the access points can be chosen to be Zadoff-Chu sequence, a Walsh sequence, or similar sequences that ease detection thereof following transmission of the PRSs. In addition, as described, PRSs can be energy boosted or spectrally reshaped in the selected resource elements to further improve hearability (e.g., since the respective access point is otherwise not transmitting in the slot).

As depicted, in positioning subframe 300, CRSs are transmitted as in other subframes for legacy support and/or identification of a related cell. In addition, data is not transmitted in the positioning subframe (but can be, for example, if it is important information such pre-scheduled broadcast information, etc.). This mitigates interference from surrounding access points improving hearability of the PRSs, which can enhance applications such as trilateration or other device location algorithms. As described, it is to be appreciated that user plane data can be transmitted by one or more access points in a portion of the subframe not utilized for transmitting PRSs and/or CRSs (and/or control data). In addition, PRSs are not embedded within CRSs so as not to interfere with current applications utilizing CRSs (e.g., channel estimation and measurement algorithms, etc.). In this regard, PRSs are provided with increased hearability to enhance trilateration or similar technologies without interfering with legacy technologies.

Figure 4:
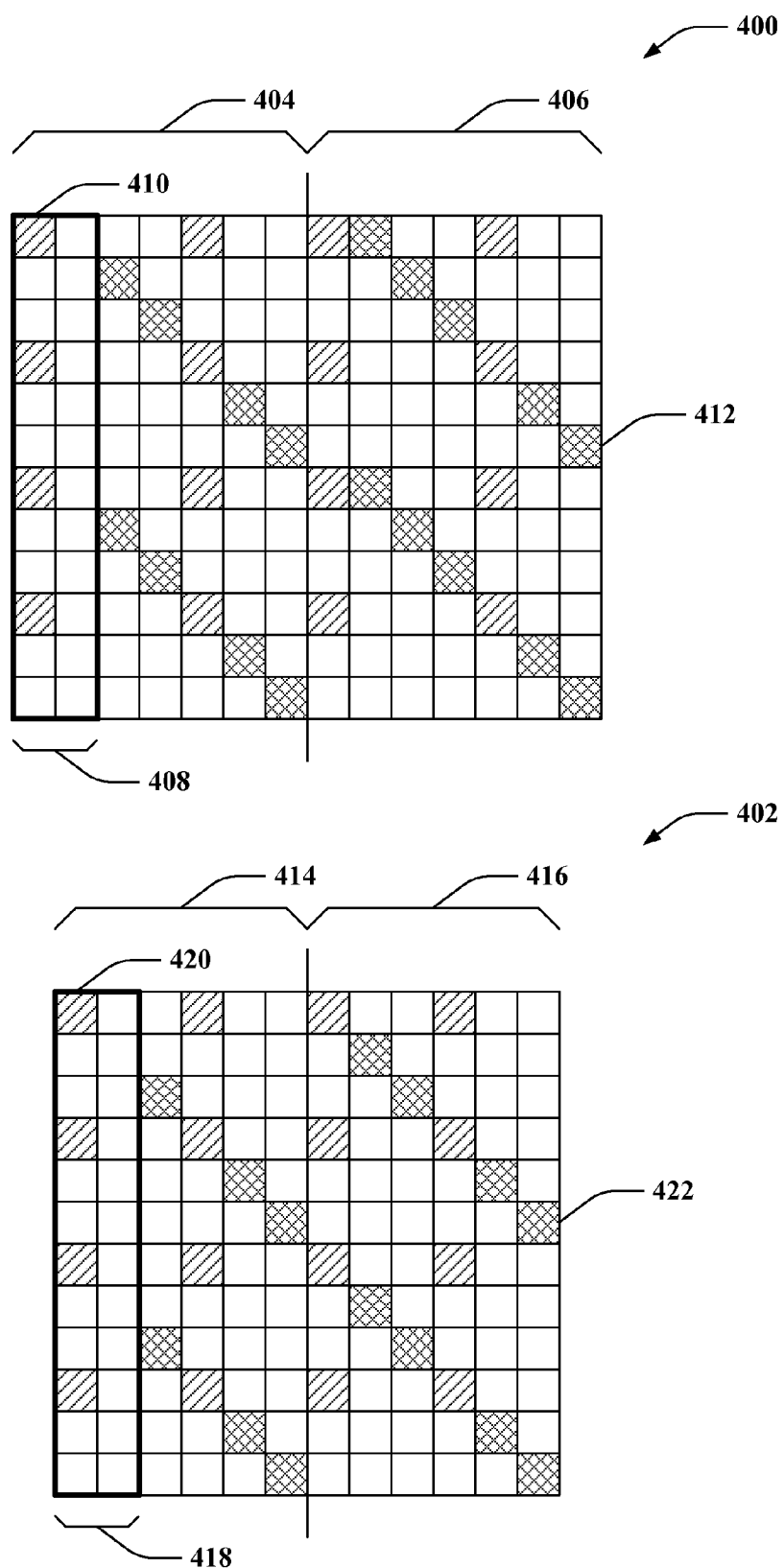
FIG. 4 illustrates example positioning subframes with control regions and resource elements allocated for CRS and PRS transmission.

Turning to FIG. 4, illustrated are example positioning subframes 400 and 402 in a wireless network transmitted by an access point with multiple antennas. For example, positioning subframes 400 and 402 can be OFDM subframes, as described. Positioning subframes 400 and 402 can be subframes (e.g., a 1 ms or similar subframe) in an LTE system communicated by an access point to one or more wireless devices. In an example, positioning subframe 400 can represent a subframe transmitted with a normal CP, and positioning subframe 402 can represent a subframe transmitted with an extended CP. Thus, for example, positioning subframe 400 can comprise 7 OFDM symbols per slot while positioning subframe 402 comprises 6 OFDM symbols per slot. In addition, in an example, access points in a wireless network (not shown) can blank user plan data transmissions over positioning subframe 400 and/or 402, as described herein.

Positioning subframe 400 comprises two slots 404 and 406. As described, in a first slot of a given subframe in LTE, control data can be transmitted over a portion of the resource elements (e.g., over one or more initial OFDM symbols). Thus, the OFDM symbols represented at 408 can be reserved for control data, which can include CRSs shown as transmitted at resource element 410 and similarly patterned resource elements within and outside of control region 408. Additionally, as depicted, resource elements outside of the control region can also be utilized for transmitting PRSs, such as resource element 412 and similarly patterned resource elements; as described, the resource elements can be collectively referred to as a PRS pattern. In addition, the PRS pattern can be a diagonal or other shifted pattern over consecutive OFDM symbols. As illustrated, the PRS pattern utilizes subcarriers over substantially all OFDM symbols in the special slot(s), except OFDM symbols in the control region 408, for transmitting the PRSs of an access point. It is to be appreciated, however, that other patterns that utilize a different subcarrier (e.g., or one or more shifted subcarriers) on substantially all OFDM symbols of the special slot(s) as the resource elements, except in the control region 408, can be utilized, as described previously. In this regard, resources elements in slot 404 and slot 406 are reserved for transmitting PRSs, so long as the resource elements are outside of the control region 408 and not interfering with CRS resource elements at 410 and similarly patterned CRS resource elements.

In addition, positioning subframe 402 comprises two slots 414 and 416. As described, in a first slot of a given subframe in LTE, control data can be transmitted over a portion of the resource elements (e.g., over one or more initial OFDM symbols). Thus, the OFDM symbols represented at 418 can be reserved for control data, which can include CRSs shown as transmitted at resource element 420 and similarly patterned resource elements within and outside of control region 418. Additionally, as depicted, resource elements outside of the control region can also be utilized for transmitting PRSs, such as resource element 422 and similarly patterned resource elements, which represent the PRS pattern for an access point. In this regard, resources elements in slot 414 and slot 416 are reserved for transmitting PRSs, so long as the resource elements are outside of the control region 418 and do not interfere with CRS resource elements at 420 and similarly patterned CRS resource elements.

Thus, in either example, the PRS patterns do not interfere with control data transmissions. In addition, as described, by transmitting PRSs in the resource elements that are otherwise silenced by the access points, hearability of the PRSs is improved. As described, resource elements 412 and 422, and similarly patterned resource elements, can be assigned to the access points in various ways. For example, the resource elements can be assigned according to a standard or network specification, which can be hardcoded in the access point implementation. In this or an alternative example, the resource elements can be assigned according to a reuse scheme, which is planned and/or pseudo-random, to the access points, or cells thereof.

Where the reuse scheme is planned, in one example, access points or related cells can be grouped into clusters where each cluster is assigned common resources for transmitting PRSs. In either case, for example, the resource elements can be assigned based at least in part on an identifier of the access point (e.g., a PCI of a cell provided by the access point), and/or the like. Moreover, for example, the sequence transmitted on the resource elements can be assigned to the access points according to a sequence, such as a Zadoff-Chu sequence, a Walsh sequence, or similar sequences that ease detection thereof. In addition, as described, PRSs can be energy boosted or spectrally reshaped in the selected resource elements to further improve hearability (e.g., since the respective access point is otherwise not transmitting in the slot).

As depicted, in positioning subframes 400 and 402, CRSs are transmitted as in other subframes for legacy support and/or identification of a related cell. In addition, data is not transmitted in the positioning subframe, at least not in the portion utilized to transmit PRSs. This mitigates interference from surrounding access points improving hearability of the PRSs, which can enhance applications such as trilateration or other device location algorithms. As described, it is to be appreciated that user plane data can be transmitted by one or more access points in a portion of the subframe not utilized for transmitting PRSs and/or CRSs (and/or control data). In addition, PRSs are not embedded within CRSs so as not to interfere with current applications utilizing CRSs (e.g., channel estimation and measurement algorithms, etc.). In this regard, PRSs are provided to enhance trilateration or similar technologies without interfering with legacy technologies.

Figure 5:
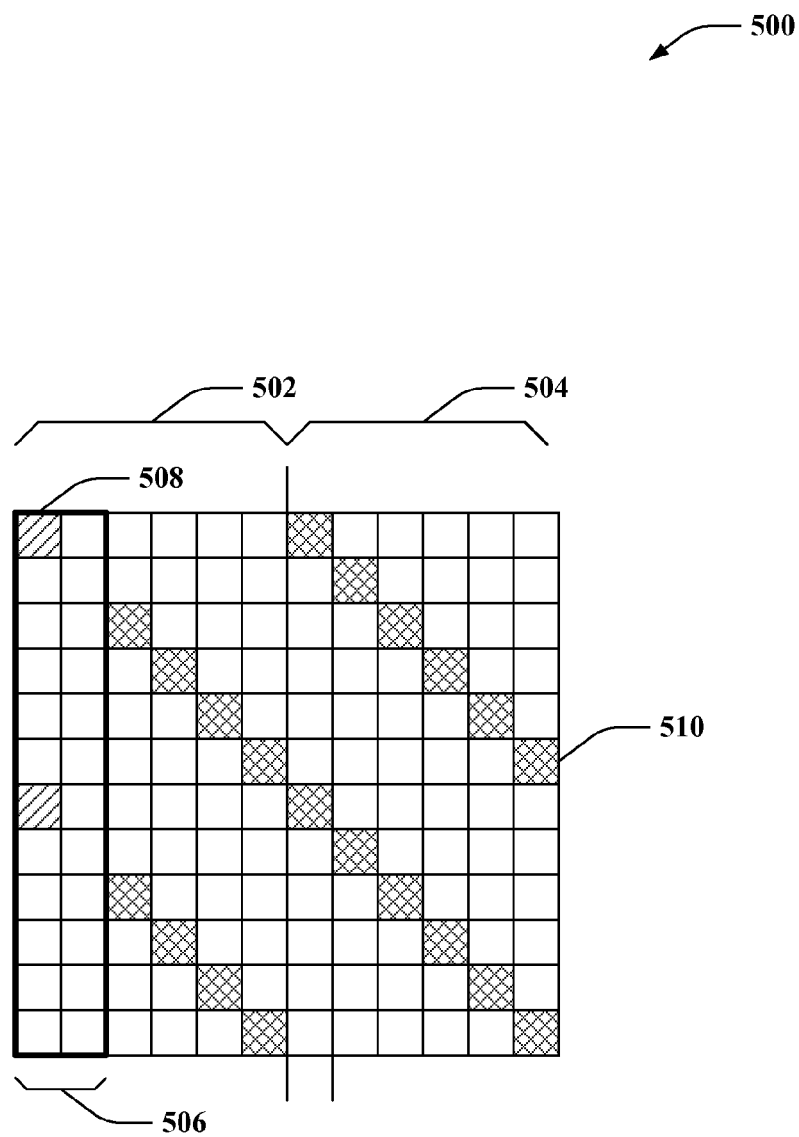
FIG. 5 illustrates an example positioning multicast/broadcast single frequency network (MBSFN) subframe.

Now referring to FIG. 5, illustrated is an example positioning subframe 500 in a wireless network. For example, positioning subframe 500 can be an OFDM subframe, as described. Positioning subframe 500 can be an MBSFN subframe (e.g., a 1 ms or similar subframe) in an LTE system communicated by an access point to one or more wireless devices according to an MBSFN specification. Positioning subframe 500 comprises two slots 502 and 504. As described, in a first slot of a given subframe in LTE, control data can be transmitted over a portion of the subframe (e.g., over one or more initial OFDM symbols) as indicated by region 506. In this regard, CRSs can be transmitted by various access points in resource element 508, and similarly patterned resource elements, in the first slot 502, along with the control data in region 506.

Since a positioning subframe 500 is indicated as a MBSFN subframe, legacy devices can receive the CRSs transmitted in the control region 506 at resource element 508 and the similarly patterned resource elements in the same OFDM symbol, and the legacy devices can ignore the remainder of the positioning subframe 500 since it is an MBSFN subframe. Access points can transmit PRSs in the remainder of slot 502 and slot 504, indicated at resource element 510 and similarly patterned resource elements, which comprises the PRS pattern, and devices equipped to process the PRSs can receive and process the PRSs to perform trilateration or similar functionalities. This minimizes confusion of legacy devices that can be caused by introduction of the PRSs and also improves hearability thereof by transmitting in slots or related subframes where transmissions from other access points are substantially blanked. In addition, as described, utilizing a PRS pattern that occupies subcarriers in substantially all OFDM symbols, avoiding control region 506, such as the illustrated diagonal pattern, can improve channel estimation of the PRSs in the MBSFN subframe.

As described, resource element 510, and similarly patterned resource elements, can be assigned to the access points in various ways for transmitting PRSs. For example, the resource elements can be assigned according to a standard or network specification, which can be hardcoded in the access point implementation, a configuration, and/or the like. In this or an alternative example, the resource elements can be assigned according to a reuse scheme, which is planned and/or pseudo-random, to the access points, or cells thereof. In either case, for example, the resource elements can be assigned based at least in part on an identifier of the access point (e.g., a PCI of a cell provided by the access point), etc. Moreover, for example, the sequence transmitted on the resource elements can be assigned to the access points according to a sequence, such as a Zadoff-Chu sequence, a Walsh sequence, or similar sequences that ease detection thereof. In addition, as described, PRSs can be energy boosted or spectrally reshaped in the selected resource elements to further improve hearability (e.g., since the respective access point is otherwise not transmitting in the slot).

Figure 6:
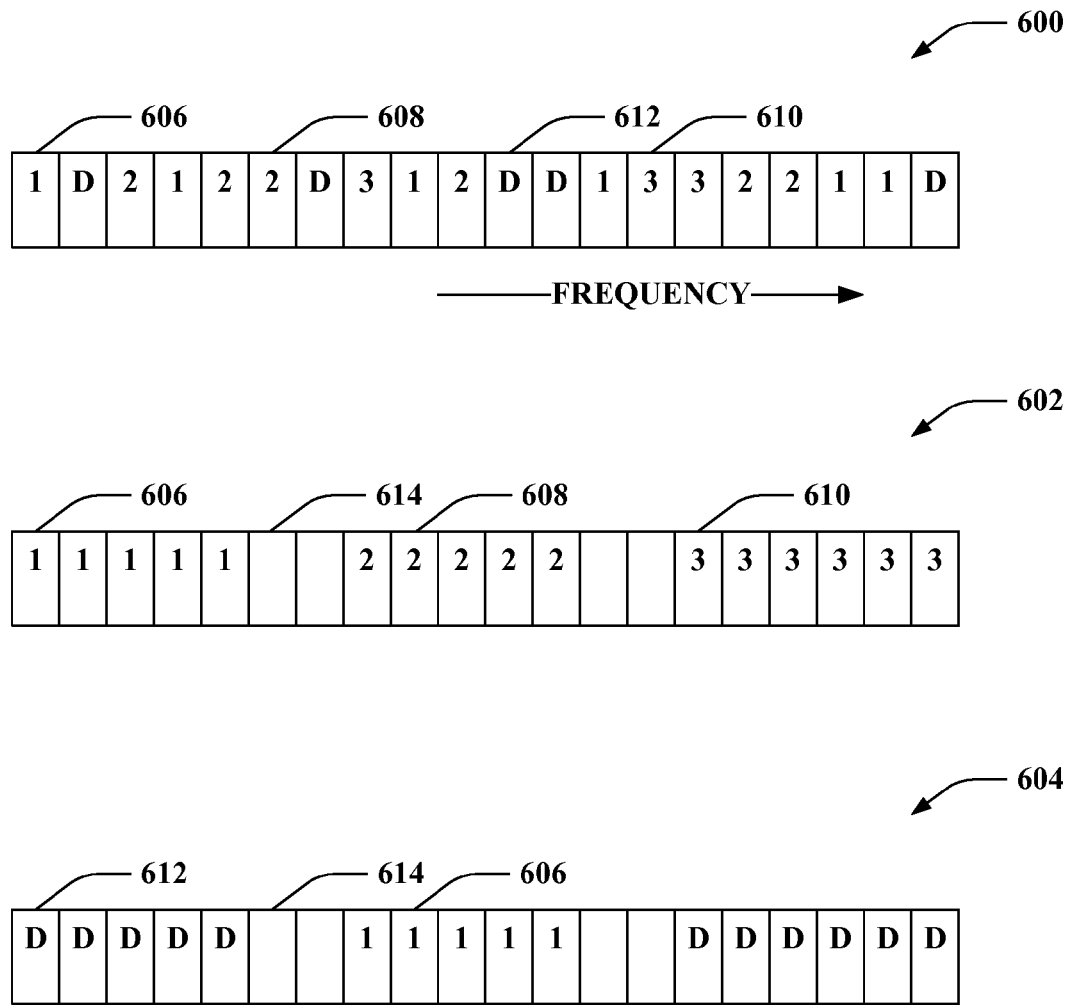
FIG. 6 illustrates example subband allocations to promote hearability of PRS transmissions.

Turning to FIG. 6, example portions of frequency 600, 602, and 604 are shown that represent PRS resource element selection schemes. For example, the portions of frequency 600, 602, and 604 can represent an allocation of a plurality of subbands (comprising a plurality of consecutive resource blocks, for example) in one or more PRS slots selected or otherwise reserved for transmitting PRSs by one or more access points in a wireless network. In addition, though a certain number of subbands are shown in the portions of frequency 600, 602, and 604, it is to be appreciated that the portions of frequency 600, 602, and 604 can include more or less subbands than those depicted.

According to an example, portion of frequency 600 can include subbands reserved for PRS/CRS transmissions as well as data transmissions. In this example, subbands that are numerically labeled, such as subbands 606, 608, and 610, as well as the subbands with like numbers, are reserved for transmitting PRS by first, second and third groups of access points respectively. In this regard, an access point can be assigned subbands that correspond to those labeled with the number 1, which includes subband 606 and the other subbands labeled with the number 1, for transmitting a PRS in a PRS slot. In addition, disparate access points can be assigned the subbands corresponding to the numerical label 2 and 3, such as subbands 608 and 610 respectively and similarly numbered subbands, for transmitting PRSs.

The access points can be assigned according to one or more reuse schemes, in one example, as described. In addition, one or more access points can transmit data (e.g., physical data shared channel (PDSCH) data) over the subbands labeled D, such as subband 612 and similarly labeled subbands. Moreover, it is to be appreciated that additional groups of reserved subbands for transmitting PRSs can be supported, though only 3 are shown for the purpose of explanation. In addition, substantially any ordering of subbands is possible and/or can be modified according to a number of factors, such as a planned scheme, a reuse scheme, a pseudo-random allocation, and/or the like. In another example, subbands for a particular purpose can be contiguous; thus, for example, subbands with the numeric label 1 can be contiguous followed by those with the numeric label 2, and so on.

In another example, portions of frequency 602 and 604 illustrate an example where bandwidth of a carrier is larger than that required for time resolution capability. In this regard, portions of frequency 602 and 604 can include guard band 614 between contiguous subbands reserved for similar types of transmissions. Thus, as shown for example, portion of frequency 602 can include no data transmission subbands, rather only subbands for transmitting PRS/CRS, such as subbands represented by numeric label 1, including subband 606, subbands represented by numeric label 2, including subband 608, and subbands represented by numeric label 3, including subband 610. The guard band 614, and similar subbands with no label, separate the subbands to facilitate independent reception of the subbands without significant interference leaked from the respective subband groups.

Portion of frequency 604 can include multiple groups of subbands reserved for data, such as subband 612 and the other subbands labeled D, as well as one or more subbands for transmitting PRS/CRS, such as subband 606 and other subbands labeled 1. Similarly, the subband groups in portion of frequency 604 can be separated by guard band 614 to facilitate independent reception of signals transmitted in the subband group since the guard band provides a separation mitigating leakage between frequency bands (and thus interference). It is to be appreciated that additional configurations are possible; portions of frequency 600, 602, and 604 are but 3 examples of allocating subbands in slots selected for transmitting PRSs to mitigate interference among the PRSs and/or data transmitted in the selected slots.

Figure 7:
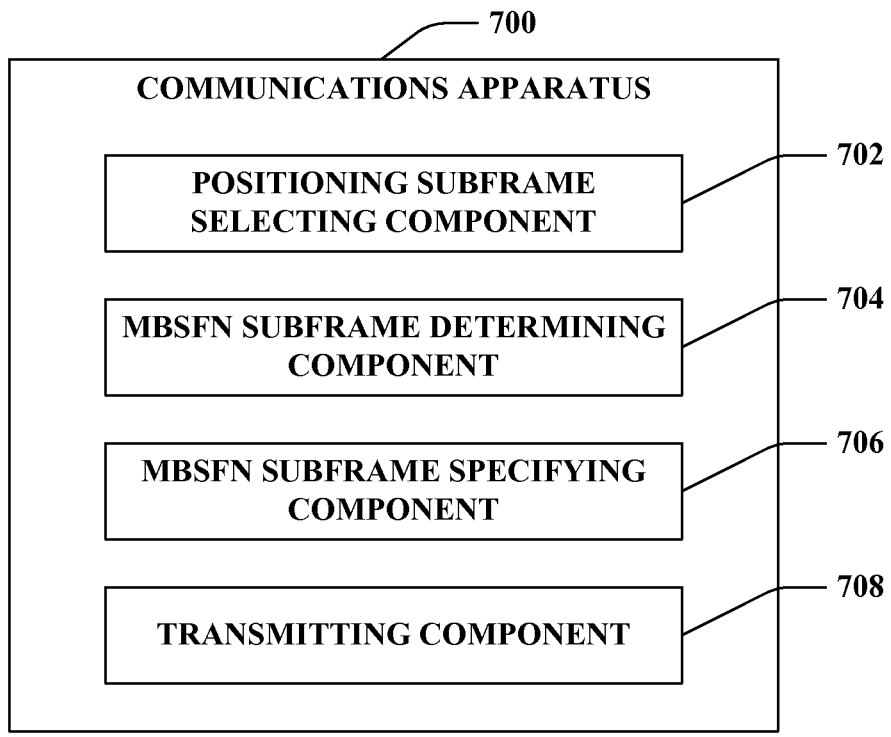
FIG. 7 is an illustration of an example communications apparatus for employment within a wireless communications environment.

Referring next to FIG. 7, a communications apparatus 700 that can participate in a wireless communications network is illustrated. The communications apparatus 700 can be an access point, a mobile device, a portion thereof, or substantially any device that receives communications in a wireless network. The communications apparatus 700 can include a positioning subframe selecting component 702 that determines one or more subframes to be a subframe for transmitting CRSs, an MBSFN subframe determining component 704 that discerns one or more subframes to be an MBSFN subframe, an MBSFN subframe specifying component 706 that can indicate a subframe as being an MBSFN subframe, and a transmitting component 708 that can transmit data and/or CRSs in one or more subframes.

According to an example, positioning subframe selecting component 702 can select one or more subframes for transmitting CRSs according to a network specification, configuration, hardcoding, etc., or according to a fixed or pseudo-random patter, and/or the like, as described. In this regard, transmitting component 708 can typically blank data transmissions and transmit CRSs in the selected positioning subframe. In addition, however, MBSFN subframe determining component 704 can select one or more of the positioning subframes to be indicated as an MBSFN subframe to mitigate CRS transmission in the MBSFN indicated subframe. This mitigates interference to other apparatuses (not shown) that transmit CRSs in the subframe, which provides a level of reuse for CRS transmission. In this way, MBSFN subframe determining component 704 can select positioning subframes to be MBSFN subframes according to one or more factors to increase reuse. For example, MBSFN subframe determining component 704 can receive an indication of a subframe to be MBSFN from an underlying wireless network (not shown), determine the subframe according to a planned or pseudorandom pattern (which can be received according to a specification, configuration, hardcoding, etc.), and/or the like. MBSFN subframe specifying component 706 can indicate the subframe as MBSFN allowing receiving devices to receive the other CRSs without attempting to decode CRSs from communications apparatus 700, for example. In addition, transmitting component 708 can blank data transmissions and transmit CRSs in positioning subframes selected by positioning subframe selecting component 702 that are not determined to be MBSFN subframes by MBSFM subframe determining component 704.

In another example, MBSFN subframe determining component 704 can discern substantially all subframes selected as positioning subframes by positioning subframe selecting component 702 to be MBSFN subframes to blank CRS transmission over the subframes. In this regard, transmitting component 708, and similar components of other apparatuses, can select MBSFN subframes for transmitting a CRS-like waveform, and blanking data transmissions, according to a planned or pseudo-random pattern, and/or the like. This increases a reuse factor for the CRSs (or similar waveforms) improving hearability thereof by some devices (e.g., LTE-A devices) over a plurality of subframes, while other devices (e.g., LTE release 8 devices) do not process the CRS-like waveforms as CRSs are not expected in MBSFN subframes, as described.

Referring now to FIGS. 8-11, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 8:
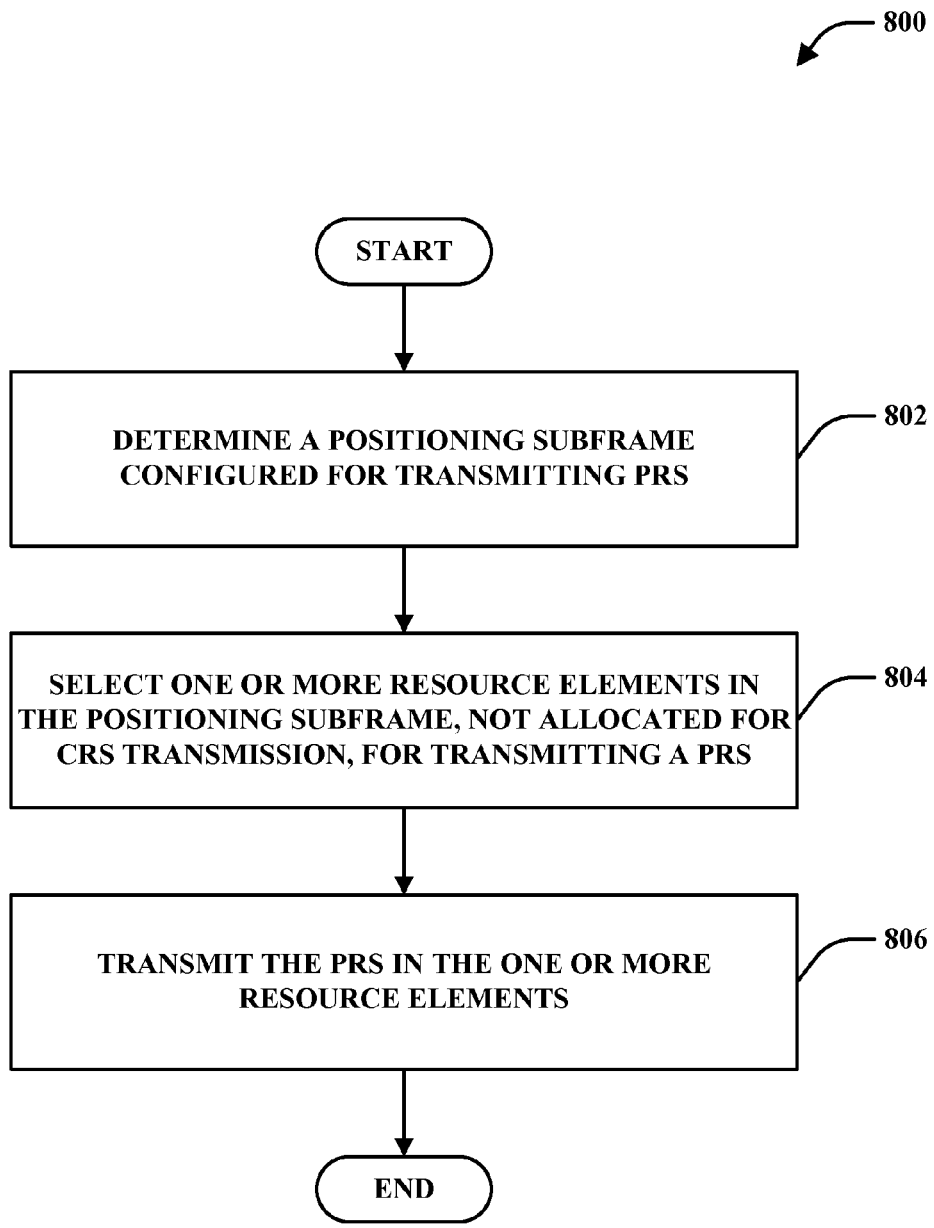
FIG. 8 is a flow diagram of an example methodology that transmits PRSs in positioning subframes improving hearability thereof.

With reference to FIG. 8, illustrated is an example methodology 800 for transmitting PRS in a portion of a positioning subframe. At 802, a positioning subframe for transmitting PRS can be determined. In one example, this can include determining a portion of the positioning subframe, such as a slot or portion thereof, allocated for PRS transmission, which can be determined based on a standard, network specification, configuration, hardcoding, and/or the like. The positioning subframe, as described, can include a plurality of resource elements, a portion of which can be reserved for CRS and/or control data transmissions. At 804, one or more resource elements in the positioning subframe, not allocated for CRS transmission, can be selected for transmitting a PRS. As described, the one or more resource elements can be selected according to a planned or pseudo-random selection function, which can be based on a cell identifier, etc.

In addition, the one or more resource elements can be excluded from those allocated for transmitting control data. In this regard, legacy devices can still receive CRSs and control data to reduce impact of introducing PRS transmissions. In another example, the one or more resource elements can be selected from within a subband of the positioning subframe, where the subband is allocated for transmitting PRSs. As described previously, the subband can be adjacent to additional subbands allocated for transmitting disparate PRSs, user plane data, etc., adjacent to guard band, and/or the like. At 806, the PRS can be transmitted in the one or more resource elements. In one example, a transmit diversity scheme can be applied to the PRS to further reduce impact of the PRSs on legacy devices and to ensure the channel estimation of the PRS has substantially no ambiguity with respect to cyclic shifts. In addition, the PRS can be transmitted utilizing substantially all available transmission power.

Figure 9:
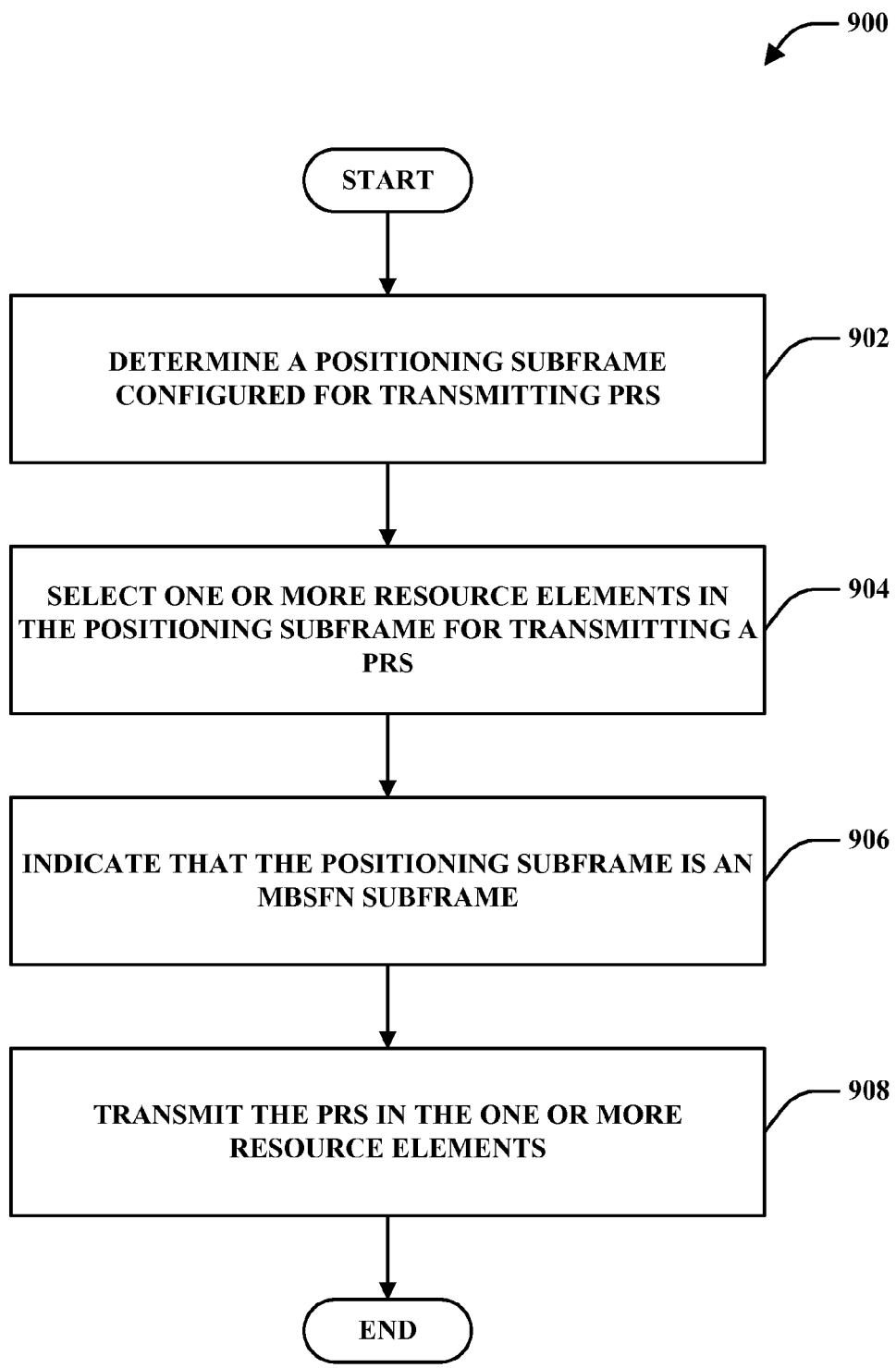
FIG. 9 is a flow diagram of an example methodology that transmits PRSs in positioning subframes indicated as MBSFN subframes.

Turning to FIG. 9, an example methodology 900 is illustrated that facilitates transmitting PRSs in a backward compatible manner. At 902, a positioning subframe for transmitting PRS can be determined. In one example, this can include determining a portion of the positioning subframe, such as a slot or portion thereof, allocated for PRS transmission. The positioning subframe, as described, can include a plurality of resource elements, a portion of which can be reserved for CRS and/or control data transmissions. At 904, one or more resource elements in the positioning subframe, not allocated for CRS transmission, can be selected for transmitting a PRS. As described, the one or more resource elements can be selected according to a planned or pseudo-random selection function, which can be based on a cell identifier, etc. At 906, it can be indicated that the positioning subframe is an MBSFN subframe. In this regard, legacy devices receiving the positioning subframe can ignore the portion not reserved for control data, and thus will not receive the PRSs. This mitigates potential confusion to the legacy devices caused by introducing the PRSs. At 908, the PRS can be transmitted in the one or more resource elements, as described.

Figure 10:
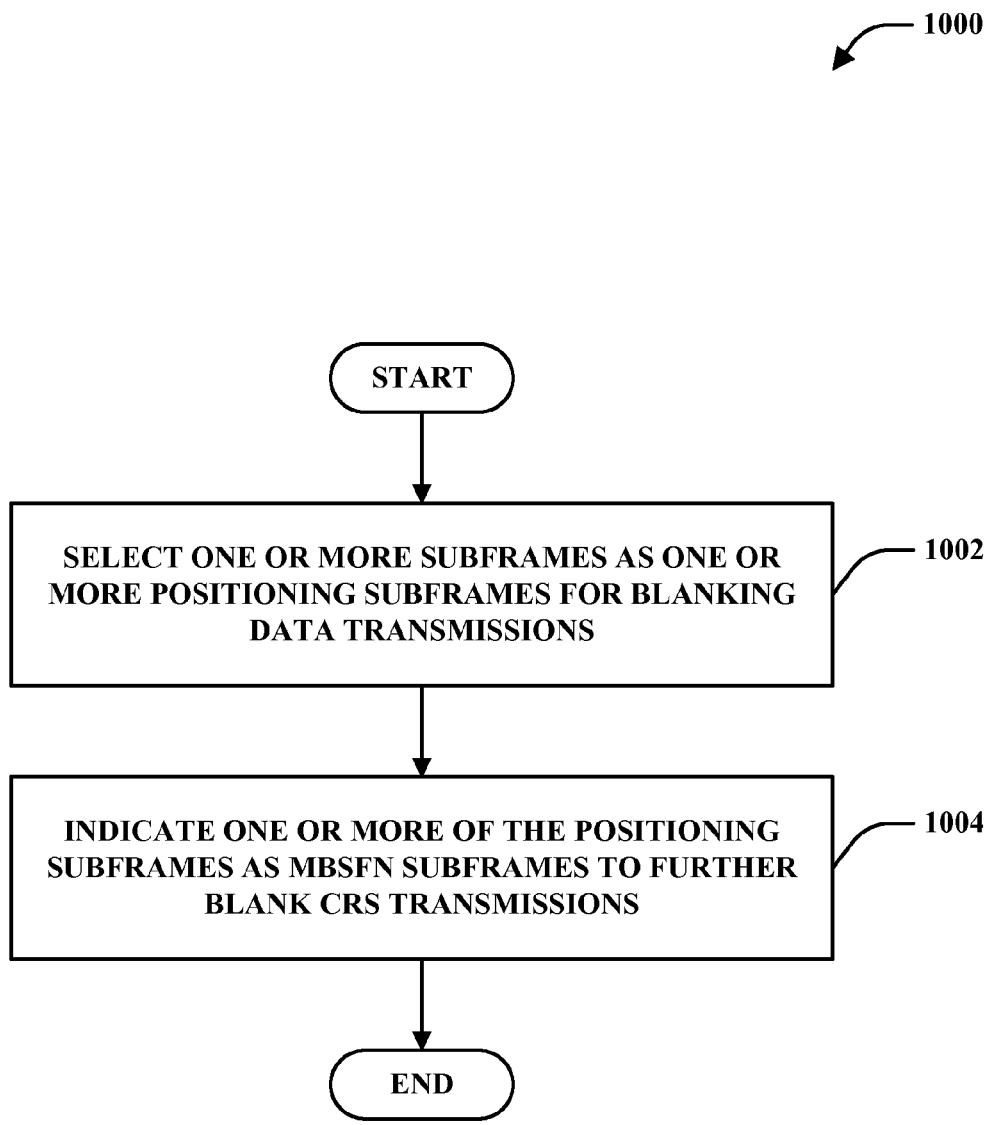
FIG. 10 is a flow diagram of an example methodology that indicates positioning subframes as MBSFN subframes to control CRS transmission thereover.

Turning to FIG. 10, an example methodology 1000 is illustrated that facilitates indicating positioning subframes as MBSFN subframes to control CRS transmission in the subframes. At 1002, one or more subframes can be selected as positioning subframes for blanking data transmissions. As described, the subframes can be selected according to a pseudo-random or planned pattern, which can be received from a network device, determined according to a network specification, configuration, or hardcoding, etc. At 1004, one or more of the positioning subframes can be indicated as MBSFN subframes to further blank CRS transmissions. As described, positioning subframes to be indicated as MBSFN subframes can be selected according to planned, pseudo-random, or other pattern to increase reuse of CRSs among multiple access points. In addition, the pattern can be defined in a network specification, configuration, hardcoding, etc. It is to be appreciated, in an alternative example, that all positioning subframes can be indicated as MBSFN subframes. Subsequently, MBSFN subframes can be selected for transmitting CRS, as described above.

Figure 11:
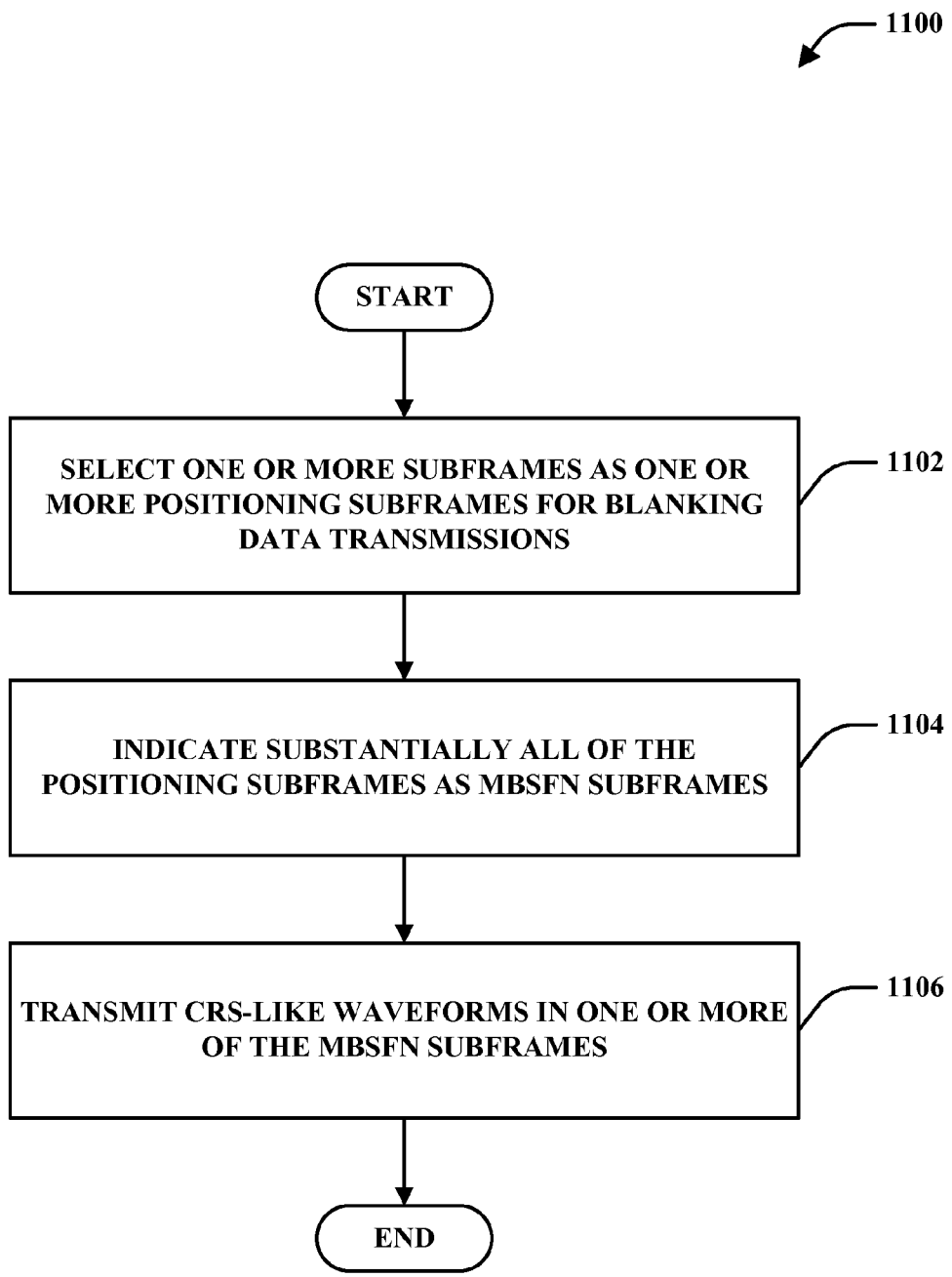
FIG. 11 is a flow diagram of an example methodology that indicates positioning subframes as MBSFN subframes and transmits CRS-like waveforms thereover.

Turning to FIG. 11, an example methodology 1100 is illustrated that facilitates indicating positioning subframes as MBSFN subframes to control CRS transmission in the subframes. At 1102, one or more subframes can be selected as positioning subframes for blanking data transmissions. As described, the subframes can be selected according to a pseudo-random or planned pattern, which can be received from a network device, determined according to a network specification, configuration, or hardcoding, etc. At 1104, substantially all of the positioning subframes can be indicated as MBSFN subframes. At 1106, CRS-like waveforms can be transmitted in one or more of the MBSFN subframes. As described, the one or more MBSFN subframes over which to transmit the CRS-like waveforms can be selected according to planned, pseudo-random, or other pattern to increase reuse of CRSs (or CRS-like waveforms) among multiple access points. In addition, the pattern can be defined in a network specification, configuration, hardcoding, etc.

It will be appreciated that, in accordance with one or more aspects described herein, inferences can be made regarding determining subframes, slots, subbands, resource blocks, resource elements, etc., for transmitting PRSs, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 12:
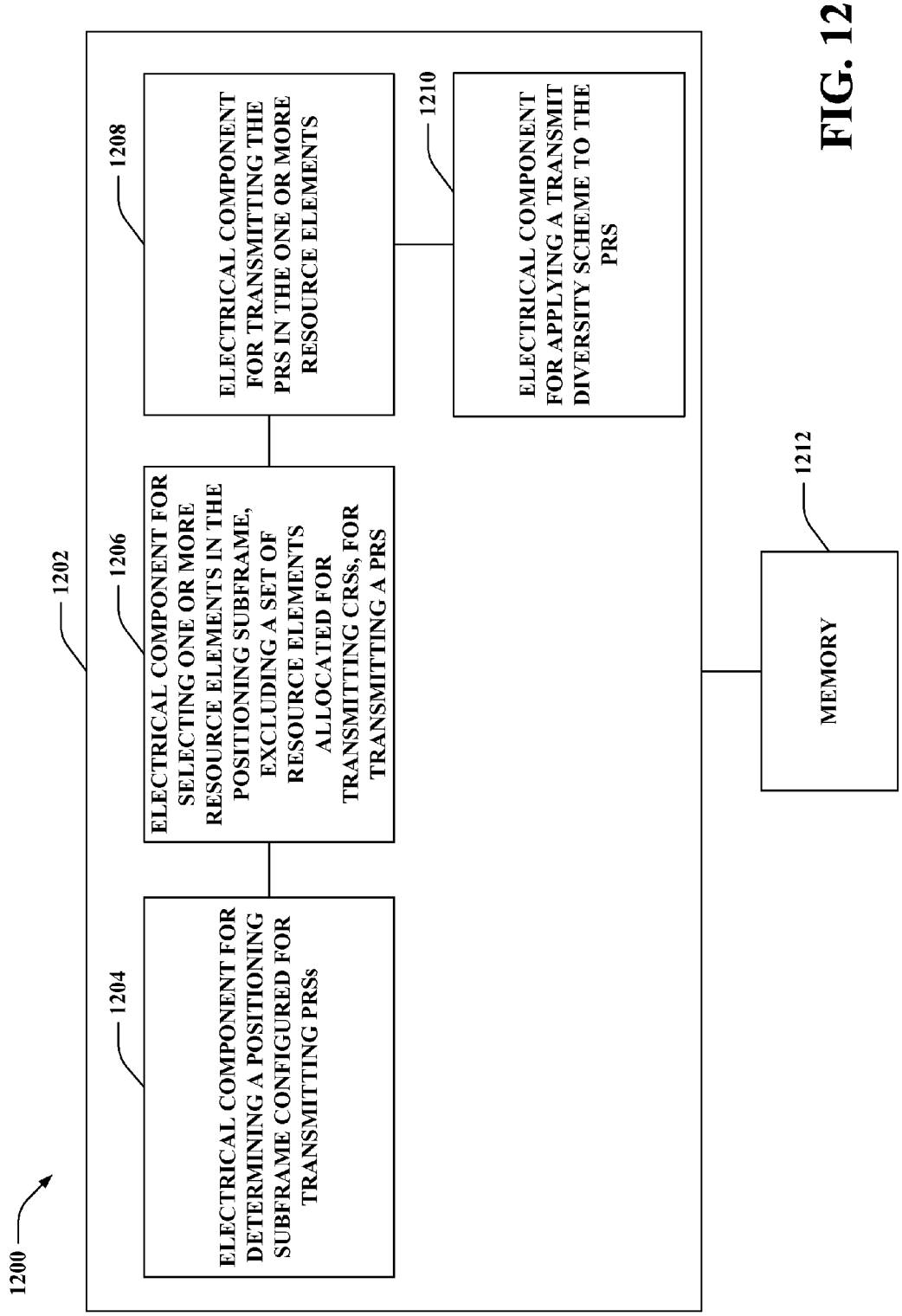
FIG. 12 is a block diagram of an example apparatus that facilitates transmitting PRSs in positioning subframes.

With reference to FIG. 12, illustrated is a system 1200 that transmits PRSs in positioning subframes to improve hearability thereof. For example, system 1200 can reside at least partially within a base station, mobile device, etc. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for determining a positioning subframe configured for transmitting PRSs 1204. As described, this can be determined from a standard, network specification, configuration, hardcoding, and/or the like. In addition, electrical component 1204 can determine a portion of the positioning subframe allocated for transmitting PRSs, such as a slot, subband, and/or the like.

Further, logical grouping 1202 can comprise an electrical component for selecting one or more resource elements in the positioning subframe, excluding a set of resource elements allocated for transmitting CRSs, for transmitting a PRS 1206. As described, this can include selecting the resource elements according to a planned or pseudo-random function, which can be based on an identifier of a cell provided by system 1200, or other constant or variable, etc. In addition, electrical component 1206 can select the one or more resource elements according to a PRS pattern, as described previously (according to the planned or pseudo-random function or otherwise), which can be a diagonal pattern or substantially any pattern that selects different resource elements from consecutive OFDM symbols in a positioning subframe for transmitting PRSs.

Moreover, logical grouping 1202 includes an electrical component for transmitting the PRS in the one or more resource elements 1208. In one example, electrical component 1208 can transmit the PRS with substantially all available transmit power. In addition, logical grouping 1202 can include an electrical component for applying a transmit diversity scheme to the PRS 1210. This can include a PVS, CDD, and/or the like to ensure the channel estimation of the PRS has substantially no ambiguity with respect to cyclic shifts. Additionally, system 1200 can include a memory 1212 that retains instructions for executing functions associated with electrical components 1204, 1206, 1208, and 1210. While shown as being external to memory 1212, it is to be understood that one or more of electrical components 1204, 1206, 1208, and 1210 can exist within memory 1212.

Figure 13:
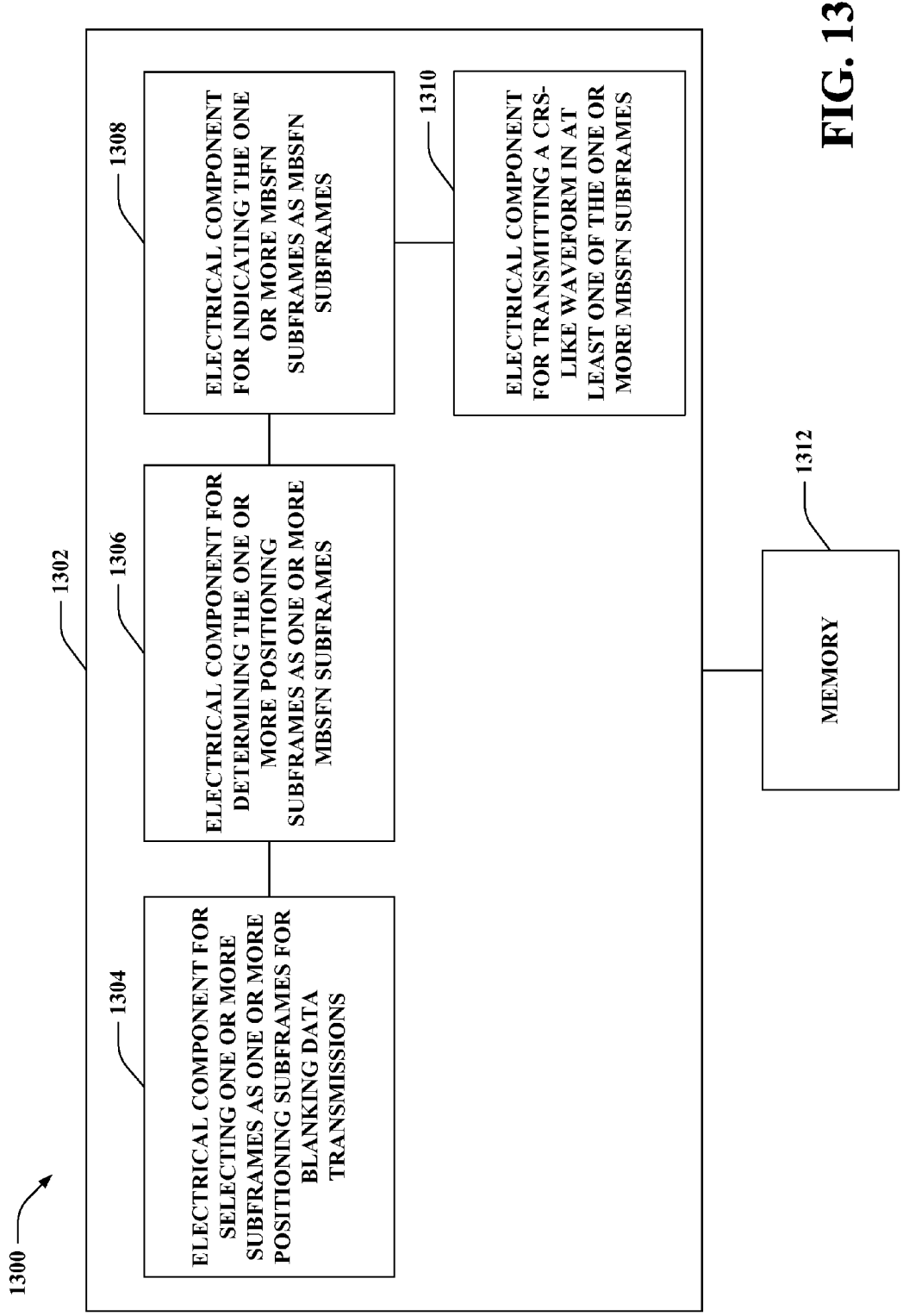
FIG. 13 is a block diagram of an example apparatus that facilitates indicating positioning subframes as MBSFN subframes to control transmitting CRSs.

With reference to FIG. 13, illustrated is a system 1300 that indicates one or more positioning subframes as an MBSFN subframe to improve hearability of CRSs. For example, system 1300 can reside at least partially within a base station, mobile device, etc. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for selecting one or more subframes as one or more positioning subframes for blanking data transmissions 1304. As described, the positioning subframes can be selected according to a planned, pseudo-random, or other pattern that can be determined or received from a standard, network specification, configuration, hardcoding, and/or the like.

Further, logical grouping 1302 can comprise an electrical component for determining the one or more positioning subframes as one or more MBSFN subframes 1306. As described, this can include selecting the MBSFN subframes according to a planned, pseudo-random, or other pattern that increases reuse of CRSs transmitted in the non-MBSFN positioning subframes. Moreover, logical grouping 1302 includes an electrical component for indicating the one or more MBSFN subframes as MBSFN subframes 1308. Thus, receiving devices can appropriately process signals received in the subframes. In addition, logical grouping 1302 can include an electrical component for transmitting CRS-like waveforms in at least one of the one or more MBSFN subframes 1310. When electrical component 1310 is present, substantially all positioning subframes can be indicated as MBSFN subframes, as described, allowing electrical component 1310 to select subframes for transmitting CRS-like waveforms to improve hearability thereof to devices able to receive and process such waveforms. Additionally, system 1300 can include a memory 1312 that retains instructions for executing functions associated with electrical components 1304, 1306, 1308, and 1310. While shown as being external to memory 1312, it is to be understood that one or more of electrical components 1304, 1306, 1308, and 1310 can exist within memory 1312.

Figure 14:
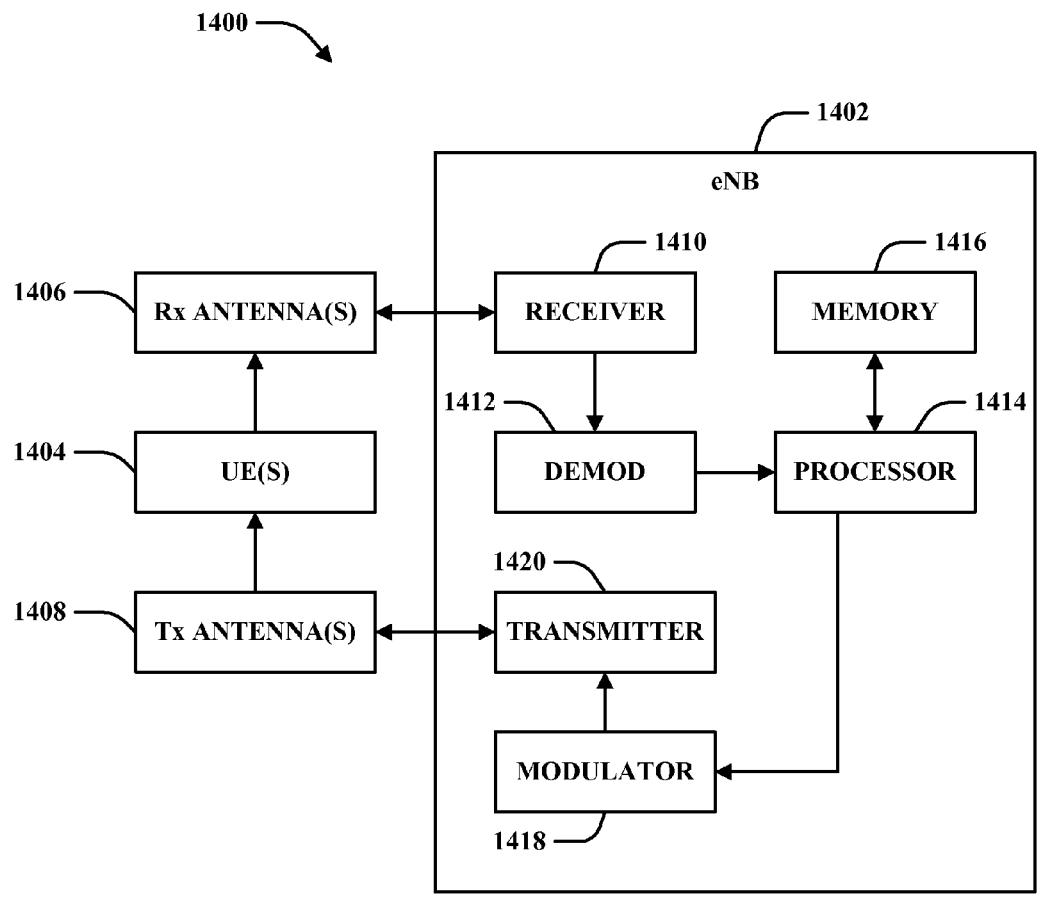
FIGS. 14-15 are block diagrams of example wireless communication devices that can be utilized to implement various aspects of the functionality described herein.

FIG. 14 is a block diagram of a system 1400 that can be utilized to implement various aspects of the functionality described herein. In one example, system 1400 includes a base station or eNB 1402. As illustrated, eNB 1402 can receive signal(s) from one or more UEs 1404 via one or more receive (Rx) antennas 1406 and transmit to the one or more UEs 1404 via one or more transmit (Tx) antennas 1408. Additionally, eNB 1402 can comprise a receiver 1410 that receives information from receive antenna(s) 1406. In one example, the receiver 1410 can be operatively associated with a demodulator (Demod) 1412 that demodulates received information. Demodulated symbols can then be analyzed by a processor 1414. Processor 1414 can be coupled to memory 1416, which can store information related to code clusters, access terminal assignments, lookup tables related thereto, unique scrambling sequences, and/or other suitable types of information. In one example, eNB 1402 can employ processor 1414 to perform methodologies 800, 900, 1000, 1100, and/or other similar and appropriate methodologies. eNB 1402 can also include a modulator 1418 that can multiplex a signal for transmission by a transmitter 1420 through transmit antenna(s) 1408.

Figure 15:
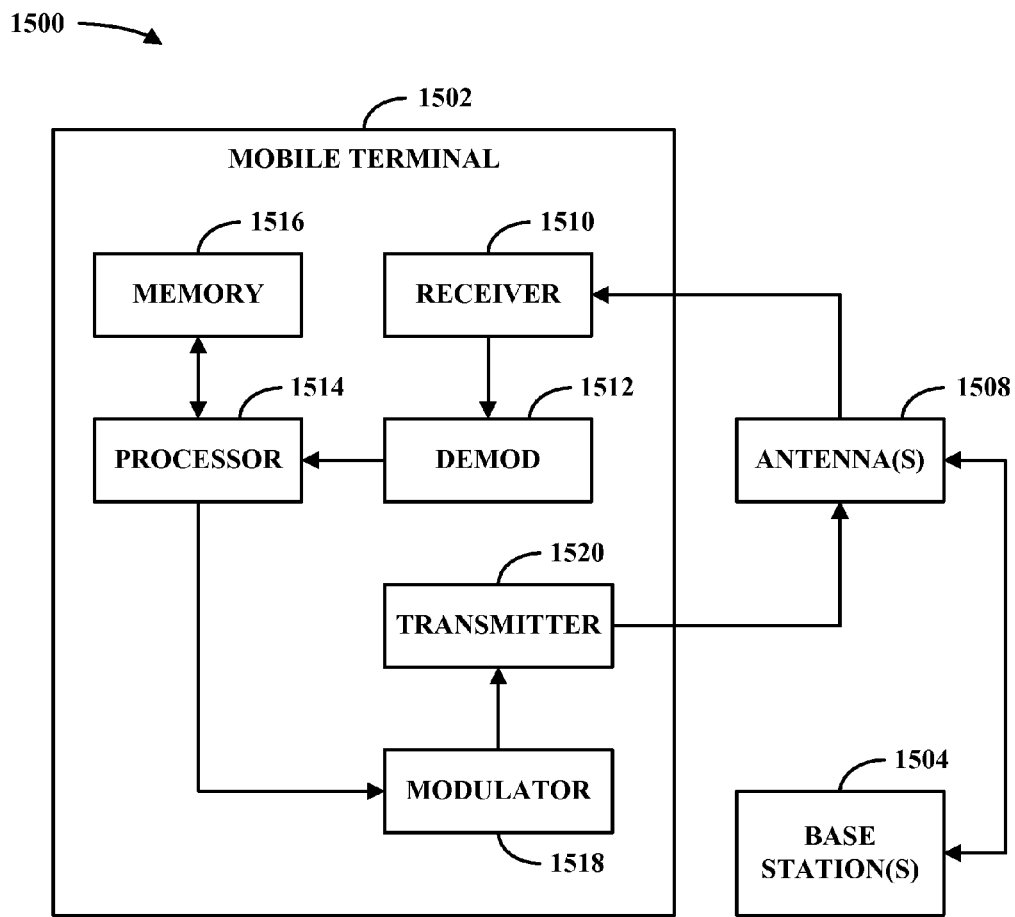

FIG. 15 is a block diagram of another system 1500 that can be utilized to implement various aspects of the functionality described herein. In one example, system 1500 includes a mobile terminal 1502. As illustrated, mobile terminal 1502 can receive signal(s) from one or more base stations 1504 and transmit to the one or more base stations 1504 via one or more antennas 1508. Additionally, mobile terminal 1502 can comprise a receiver 1510 that receives information from antenna(s) 1508. In one example, receiver 1510 can be operatively associated with a demodulator (Demod) 1512 that demodulates received information. Demodulated symbols can then be analyzed by a processor 1514. Processor 1514 can be coupled to memory 1516, which can store data and/or program codes related to mobile terminal 1502. Additionally, mobile terminal 1502 can employ processor 1514 to perform methodologies 800, 900, 1000, 1100, and/or other similar and appropriate methodologies. Mobile terminal 1502 can also employ one or more components described in previous figures to effectuate the described functionality; in one example, the components can be implemented by the processor 1514. Mobile terminal 1502 can also include a modulator 1518 that can multiplex a signal for transmission by a transmitter 1520 through antenna(s) 1508.

Figure 16:
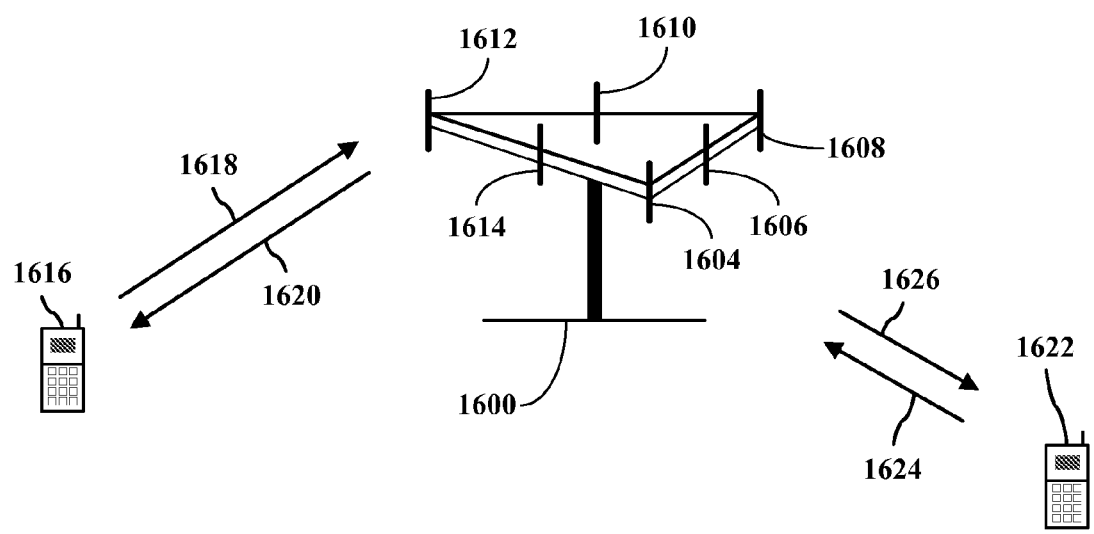
FIG. 16 illustrates an example wireless multiple-access communication system in accordance with various aspects set forth herein.

Referring now to FIG. 16, an illustration of a wireless multiple-access communication system is provided in accordance with various aspects. In one example, an access point 1600 (AP) includes multiple antenna groups. As illustrated in FIG. 16, one antenna group can include antennas 1604 and 1606, another can include antennas 1608 and 1610, and another can include antennas 1612 and 1614. While only two antennas are shown in FIG. 16 for each antenna group, it should be appreciated that more or fewer antennas may be utilized for each antenna group. In another example, an access terminal 1616 can be in communication with antennas 1612 and 1614, where antennas 1612 and 1614 transmit information to access terminal 1616 over forward link 1620 and receive information from access terminal 1616 over reverse link 1618. Additionally and/or alternatively, access terminal 1622 can be in communication with antennas 1606 and 1608, where antennas 1606 and 1608 transmit information to access terminal 1622 over forward link 1626 and receive information from access terminal 1622 over reverse link 1624. In a frequency division duplex system, communication links 1618, 1620, 1624 and 1626 can use different frequency for communication. For example, forward link 1620 may use a different frequency then that used by reverse link 1618.

Each group of antennas and/or the area in which they are designed to communicate can be referred to as a sector of the access point. In accordance with one aspect, antenna groups can be designed to communicate to access terminals in a sector of areas covered by access point 1600. In communication over forward links 1620 and 1626, the transmitting antennas of access point 1600 can utilize beamforming in order to improve the signal-to-noise ratio of forward links for the different access terminals 1616 and 1622. Also, an access point using beamforming to transmit to access terminals scattered randomly through its coverage causes less interference to access terminals in neighboring cells than an access point transmitting through a single antenna to all its access terminals.

An access point, e.g., access point 1600, can be a fixed station used for communicating with terminals and can also be referred to as a base station, an eNB, an access network, and/or other suitable terminology. In addition, an access terminal, e.g., an access terminal 1616 or 1622, can also be referred to as a mobile terminal, user equipment, a wireless communication device, a terminal, a wireless terminal, and/or other appropriate terminology.

Figure 17:
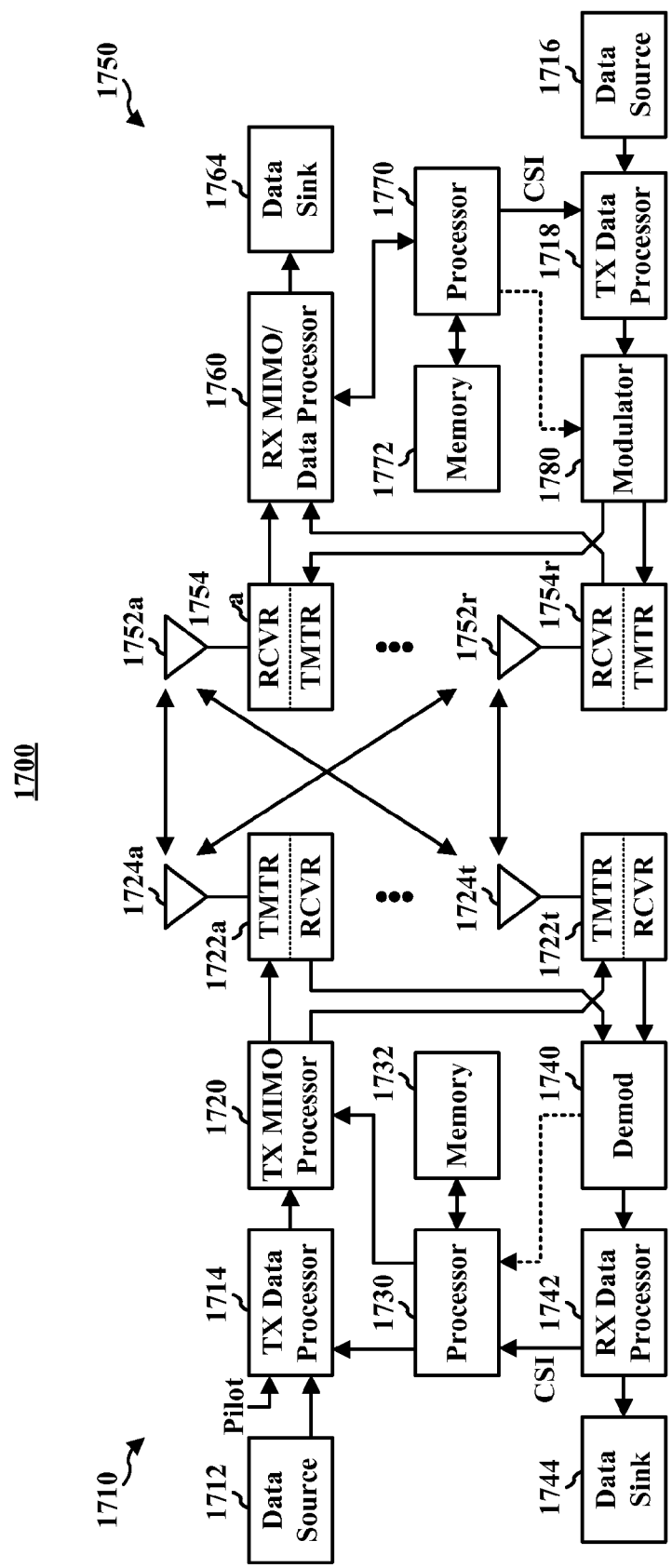
FIG. 17 is a block diagram illustrating an example wireless communication system in which various aspects described herein can function.

Referring now to FIG. 17, a block diagram illustrating an example wireless communication system 1700 in which various aspects described herein can function is provided. In one example, system 1700 is a multiple-input multiple-output (MIMO) system that includes a transmitter system 1710 and a receiver system 1750. It should be appreciated, however, that transmitter system 1710 and/or receiver system 1750 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1710 and/or receiver system 1750 described herein could be utilized in connection with a single output to single input antenna system.

In accordance with one aspect, traffic data for a number of data streams are provided at transmitter system 1710 from a data source 1712 to a transmit (TX) data processor 1714. In one example, each data stream can then be transmitted via a respective transmit antenna 1724. Additionally, TX data processor 1714 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1750 to estimate channel response. Back at transmitter system 1710, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1730.

Next, modulation symbols for all data streams can be provided to a TX processor 1720, which can further process the modulation symbols (e.g., for OFDM). TX MIMO processor 1720 can then provides $N_T$ modulation symbol streams to $N_T$ transceivers 1722a through 1722t. In one example, each transceiver 1722 can receive and process a respective symbol stream to provide one or more analog signals. Each transceiver 1722 can then further condition (e.g., amplify, filter, and upconvert) the analog signals to provide a modulated signal suitable for transmission over a MIMO channel. Accordingly, $N_T$ modulated signals from transceivers 1722a through 1722t can then be transmitted from $N_T$ antennas 1724a through 1724t, respectively.

In accordance with another aspect, the transmitted modulated signals can be received at receiver system 1750 by $N_R$ antennas 1752a through 1752r. The received signal from each antenna 1752 can then be provided to respective transceivers 1754. In one example, each transceiver 1754 can condition (e.g., filter, amplify, and downconvert) a respective received signal, digitize the conditioned signal to provide samples, and then processes the samples to provide a corresponding "received" symbol stream. An RX MIMO/data processor 1760 can then receive and process the $N_R$ received symbol streams from $N_R$ transceivers 1754 based on a particular receiver processing technique to provide $N_T$ "detected" symbol streams. In one example, each detected symbol stream can include symbols that are estimates of the modulation symbols transmitted for the corresponding data stream. RX processor 1760 can then process each symbol stream at least in part by demodulating, deinterleaving, and decoding each detected symbol stream to recover traffic data for a corresponding data stream. Thus, the processing by RX processor 1760 can be complementary to that performed by TX MIMO processor 1720 and TX data processor 1718 at transmitter system 1710.

RX processor 1760 can additionally provide processed symbol streams to a data sink 1764.

In accordance with one aspect, the channel response estimate generated by RX processor 1760 can be used to perform space/time processing at the receiver, adjust power levels, change modulation rates or schemes, and/or other appropriate actions. Additionally, RX processor 1760 can further estimate channel characteristics such as, for example, signal-to-noise-and-interference ratios (SNRs) of the detected symbol streams. RX processor 1760 can then provide estimated channel characteristics to a processor 1770. In one example, RX processor 1760 and/or processor 1770 can further derive an estimate of the "operating" SNR for the system. Processor 1770 can then provide channel state information (CSI), which can comprise information regarding the communication link and/or the received data stream. This information can include, for example, the operating SNR. The CSI can then be processed by a TX data processor 1718, modulated by a modulator 1780, conditioned by transceivers 1754a through 1754r, and transmitted back to transmitter system 1710. In addition, a data source 1716 at receiver system 1750 can provide additional data to be processed by TX data processor 1718.

Back at transmitter system 1710, the modulated signals from receiver system 1750 can then be received by antennas 1724, conditioned by transceivers 1722, demodulated by a demodulator 1740, and processed by a RX data processor 1742 to recover the CSI reported by receiver system 1750. In one example, the reported CSI can then be provided to processor 1730 and used to determine data rates as well as coding and modulation schemes to be used for one or more data streams. The determined coding and modulation schemes can then be provided to transceivers 1722 for quantization and/or use in later transmissions to receiver system 1750. Additionally and/or alternatively, the reported CSI can be used by processor 1730 to generate various controls for TX data processor 1714 and TX MIMO processor 1720. In another example, CSI and/or other information processed by RX data processor 1742 can be provided to a data sink 1744.

In one example, processor 1730 at transmitter system 1710 and processor 1770 at receiver system 1750 direct operation at their respective systems. Additionally, memory 1732 at transmitter system 1710 and memory 1772 at receiver system 1750 can provide storage for program codes and data used by processors 1730 and 1770, respectively. Further, at receiver system 1750, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
   determining a positioning subframe configured for transmitting positioning reference signals (PRS);
   selecting one or more resource elements in the positioning subframe for transmitting a PRS avoiding resource elements in the positioning subframe configured for transmitting cell-specific reference signals (CRS); and
   transmitting a PRS in the one or more resource elements.

2. The method of claim 1, wherein the selecting one or more resource elements includes selecting the one or more resource elements in a portion of the positioning subframe.

3. The method of claim 2, wherein the selecting one or more resource elements in the portion of the positioning subframe includes selecting the one or more resource elements in a slot of the positioning subframe.

4. The method of claim 3, wherein the slot of the positioning subframe is adjacent to a disparate slot of the positioning subframe that includes a set of resource elements reserved for transmitting control data.

5. The method of claim 3, wherein the selecting one or more resource elements includes selecting the one or more resource elements in consecutive orthogonal frequency division multiplexing (OFDM) symbols in the slot of the positioning subframe.

6. The method of claim 5, wherein the selecting one or more resource elements in consecutive OFDM symbols includes shifting between subcarriers of the consecutive OFDM symbols.

7. The method of claim 6, wherein the shifting between subcarriers of the consecutive OFDM symbols includes shifting between subcarriers of the consecutive OFDM symbols according to a diagonal pattern.

8. The method of claim 3, wherein the selecting one or more resource elements includes selecting the one or more resource elements to have a similar periodicity and a similar structure as CRSs.

9. The method of claim 1, wherein the selecting one or more resource elements includes selecting the one or more resource elements according to a planned selection function or a pseudo-random selection function.

10. The method of claim 1, wherein the selecting one or more resource elements in the positioning subframe for transmitting the PRS further includes avoiding a portion of the positioning subframe allocated for control data transmissions.

11. The method of claim 1, further comprising applying a transmit diversity scheme to the PRS.

12. The method of claim 11, wherein the transmitting the PRS is performed over a single antenna port utilized to transmit remaining PRSs in the positioning subframe.

13. The method of claim 1, wherein the selecting one or more resource elements in the positioning subframe includes selecting the one or more resource elements from a subband, comprising a plurality of consecutive resource blocks, related to transmitting the PRS according to a network specification or a configuration.

14. The method of claim 1, further comprising indicating that the positioning subframe is a multicast/broadcast single frequency network subframe.

15. The method of claim 1, wherein the transmitting the PRS in the one or more resource elements includes transmitting the PRS according to a Zadoff-Chu sequence, a Walsh sequence, or a quadrature phase-shift keying sequence to ease detection of the PRS.

16. A wireless communications apparatus, comprising:
at least one processor configured to:
select a portion of a positioning subframe for transmitting positioning reference signals (PRS);
determine one or more resource elements in the positioning subframe, excluding a plurality of disparate resource elements allocated for transmitting cell-specific reference signals (CRS), for transmitting a PRS; and
transmit the PRS in the one or more resource elements; and
a memory coupled to the at least one processor.

17. The wireless communications apparatus of claim 16, wherein the portion of the positioning subframe is a slot of the positioning subframe.

18. The wireless communications apparatus of claim 17, wherein the slot of the positioning subframe is adjacent to a disparate slot of the positioning subframe that includes a set of resource elements reserved for transmitting control data.

19. The wireless communications apparatus of claim 17, wherein the one or more resource elements are in consecutive orthogonal frequency division multiplexing (OFDM) symbols in the slot of the positioning subframe.

20. The wireless communications apparatus of claim 19, wherein the one or more resource elements include shifted subcarriers of the consecutive OFDM symbols.

21. The wireless communications apparatus of claim 20, wherein the shifted subcarriers correspond to a diagonal pattern.

22. The wireless communications apparatus of claim 16, wherein the at least one processor determines the one or more resource elements according to a planned selection function or a pseudo-random selection function.

23. The wireless communications apparatus of claim 16, wherein the at least one processor is further configured to apply a transmit diversity scheme to the PRS.

24. An apparatus, comprising:
means for determining a positioning subframe configured for transmitting positioning reference signals (PRS);
means for selecting one or more resource elements in the positioning subframe, excluding a set of resource elements allocated for transmitting cell-specific reference signals (CRS), for transmitting a PRS; and
means for transmitting the PRS in the one or more resource elements.

25. The apparatus of claim 24, wherein the means for determining the positioning subframe determines at least a portion of a slot of the positioning subframe configured for transmitting PRSs.

26. The apparatus of claim 25, wherein the at least the portion of the slot is adjacent to a disparate slot of the positioning subframe that includes a disparate portion allocated for transmitting control data.

27. The apparatus of claim 25, wherein the means for selecting one or more resource elements in the positioning subframe selects the one or more resource elements from consecutive orthogonal frequency division multiplexing (OFDM) symbols in the slot of the positioning subframe.

28. The apparatus of claim 27, wherein the means for selecting one or more resource elements in the positioning subframe selects the one or more resource elements as shifted subcarriers in each of the consecutive OFDM symbols.

29. The apparatus of claim 28, wherein the one or more resource elements form a diagonal pattern.

30. The apparatus of claim 24, further comprising means for applying a transmit diversity scheme to the PRS.

31. A computer program product, comprising:
a computer-readable medium comprising:
code for causing at least one computer to select a portion of a positioning subframe for transmitting positioning reference signals (PRS);
code for causing the at least one computer to determine one or more resource elements in the positioning subframe, excluding a plurality of disparate resource elements allocated for transmitting cell-specific reference signals (CRS), for transmitting a PRS; and
code for causing the at least one computer to transmit the PRS in the one or more resource elements.

32. The computer program product of claim 31, wherein the portion of the positioning subframe is a slot of the positioning subframe.

33. The computer program product of claim 32, wherein the slot of the positioning subframe is adjacent to a disparate slot of the positioning subframe that includes a set of resource elements reserved for transmitting control data.

34. The computer program product of claim 32, wherein the one or more resource elements are comprise within consecutive orthogonal frequency division multiplexing (OFDM) symbols in the slot of the positioning subframe.

35. The computer program product of claim 34, wherein the one or more resource elements are comprised within subcarriers shifted among the consecutive OFDM symbols according to a pattern.

36. The computer program product of claim 35, wherein the pattern is a diagonal pattern.

37. An apparatus, comprising:
a special slot selecting component that determines a positioning subframe configured for transmitting positioning reference signals (PRS);
a PRS resource element selecting component that selects one or more resource elements in the positioning subframe, excluding a set of resource elements allocated for transmitting cell-specific reference signals (CRS), for transmitting a PRS; and
a PRS transmitting component that transmits the PRS in the one or more resource elements.

38. The apparatus of claim 37, wherein the special slot selecting component determines at least a portion of a slot of the positioning subframe configured for transmitting PRSs.

39. The apparatus of claim 38, wherein the at least the portion of the slot is adjacent to a disparate slot of the positioning subframe that includes a disparate portion allocated for transmitting control data.

40. The apparatus of claim 39, wherein the PRS resource element selecting component selects the one or more resource elements from consecutive orthogonal frequency division multiplexing (OFDM) symbols in the slot of the positioning subframe.

41. The apparatus of claim 40, wherein the PRS resource element selecting component selects the one or more resource elements as shifted subcarriers in each of the consecutive OFDM symbols.

42. The apparatus of claim 41, wherein the one or more resource elements form a diagonal pattern.

* * * * *